United States Patent
Reese et al.

(10) Patent No.: US 10,723,830 B1
(45) Date of Patent: Jul. 28, 2020

(54) PRODUCT-TO-PRODUCT PROCESS FOR PREPARATION OF LOW VISCOSITY POLYOXYALKYLENE POLYETHER POLYOLS

(71) Applicants: Covestro LLC, Pittsburgh, PA (US); Covestro Deutschland AG, Leverkusen (DE)

(72) Inventors: Jack R. Reese, Coraopolis, PA (US); Edward P. Browne, Köln (DE); Yue Yang, Canton, MI (US); Jose F. Pazos, Charleston, WV (US)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/582,177

(22) Filed: Sep. 25, 2019

Related U.S. Application Data

(60) Provisional application No. 62/825,192, filed on Mar. 28, 2019.

(51) Int. Cl.
*C08G 18/48* (2006.01)
*C08G 65/26* (2006.01)

(52) U.S. Cl.
CPC ..... *C08G 18/4804* (2013.01); *C08G 65/2663* (2013.01)

(58) Field of Classification Search
CPC .............. C08G 18/4804; C08G 65/2663
USPC ........................................................ 521/27
See application file for complete search history.

(56) References Cited

U.S. PATENT DOCUMENTS

| | | | |
|---|---|---|---|
| 3,427,334 A | 2/1969 | Belner | |
| 3,941,849 A | 3/1976 | Herold | |
| 4,477,589 A | 10/1984 | van der Hulst et al. | |
| 5,158,922 A | 10/1992 | Hinney et al. | |
| 5,470,813 A | 11/1995 | Le-Khac | |
| 5,482,908 A | 1/1996 | Le-Khac | |
| 5,689,012 A * | 11/1997 | Pazos | C08G 65/2696 568/619 |
| 5,919,988 A * | 7/1999 | Pazos | C08G 65/2663 568/679 |
| 6,077,978 A | 6/2000 | McDaniel et al. | |
| 7,919,575 B2 | 4/2011 | Browne | |
| 2011/0230581 A1 * | 9/2011 | Klescewski | C08G 65/2663 521/174 |
| 2017/0137569 A1 * | 5/2017 | Hofmann | C08G 64/34 |

OTHER PUBLICATIONS

M. Ionescu, "Chemistry and Technology of Polyols for Polyurethanes", 2nd Edition, vol. 1, 2016, pp. 189-190.

* cited by examiner

*Primary Examiner* — Michael Bernshteyn
(74) *Attorney, Agent, or Firm* — N. Denise Brown

(57) ABSTRACT

This invention relates to a semi-batch process for preparing low viscosity polyoxyalkylene polyether polyols (P) that have a narrow molecular weight distribution. This process comprises reacting a H-functional starter substance ($S_i$), a H-functional starter substance ($S_x$) and a H-functional starter substance ($S_c$) with one or more alkylene oxides in the presence of a double metal cyanide (DMC) catalyst. The resultant polyoxyalkylene polyols (P) have a functionality of 2 to 8 and a hydroxyl number of 5 to 35 mg KOH/g polyol. In addition, the polyoxyalkylation can be completed with a low continuous addition of starter (CAOS) cap.

28 Claims, 4 Drawing Sheets

PRODUCT-TO-PRODUCT PROCESS FOR PREPARATION OF LOW VISCOSITY POLYOXYALKYLENE POLYETHER POLYOLS

FIELD OF THE INVENTION

This invention relates to an improved process for preparing low viscosity polyoxyalkylene polyols (P). These polyoxyalkylene polyols (P) have a functionality of 2 to 8 and a hydroxyl (OH) number of from about 5 mg KOH/g polyol to 35 mg KOH/g polyol. This invention also relates to an improved semi-batch process that eliminates the need to use a polyether polyol of lower molecular weight to produce a polyether polyol of higher molecular weight by using a starter charge of the targeted polyether polyol product and a low equivalent weight starter substance as the initial polyether polyol starter mixture.

BACKGROUND

A challenge with the commercial production of DMC catalyzed polyols is the inability to directly use low equivalent weight substances such as propylene glycol, dipropylene glycol and glycerin as the main component of the starter mixture. These low equivalent weight starter substances inhibit the catalytic activity of the DMC catalyst when present as the main component of the starter mixture for the production of a semi-batch DMC catalyzed polyether polyol. Starting a reaction with such low equivalent weight starter substances also requires special commercial equipment as the amount of starter required to make higher equivalent weight products is small. For example, when making a 500 equivalent weight propylene glycol started polyether polyol, 7.5 weight percent propylene glycol is required as the low equivalent weight starter. However, when making a 4000 equivalent weight propylene glycol started polyether polyol, only 0.95 weight percent propylene glycol is required as the low equivalent weight starter. Therefore, the preparation of a 4000 equivalent weight propylene glycol started polyether polyol requires a large reaction build ratio. The reaction build ratio is defined as the product equivalent weight divided by the starter equivalent weight. Thus, for a propylene glycol started 500 EW polyether polyol, the reaction build ratio would be 500/38 or 13.2. By comparison, in the case of a 4000 EW polyether polyol the build ratio would be 4000/38 or 105. This large reaction build ratio would require special reaction equipment to handle the low amount of starter required at the start of the process. The minimum reactor charge is dictated by the mixing configuration (i.e. touching or covering lowest most agitator blade) and the heating requirements (i.e. covering sufficient surface area for jacketed or internal heating/cooling systems or filling the external recirculation loop for external heating/cooling systems). The industry has overcome this challenge of the commercial production of products having a wide range of equivalent weights by making and storing starter polyether polyols that can cover the whole range of products to be made. Typically, this may require more than one starter polyether polyol be stored. One starter polyether polyol to make low to intermediate equivalent weight products (i.e. those having hydroxyl numbers of 112 to 28 mg KOH/g polyol) and another starter polyether polyol to make higher equivalent weight products (i.e. those having hydroxyl numbers of <28 mg KOH/g polyol). As one skilled in the art will recognize, these starter polyether polyols, referred to herein as low equivalent weight starter polyether polyols, are lower in equivalent weight than the targeted polyether polyol product but higher in equivalent weight than the initial low equivalent weight starter substance (i.e., propylene glycol, dipropylene glycol, glycerin, etc.) and are initially charged to the reactor to provide the minimum charge required for the reactor configuration. The storage of these low equivalent weight starter polyether polyols and preparation of them in the reactor systems takes away from resources to make the finished products. Therefore, there is a need to eliminate these low equivalent weight starter polyether polyols.

SUMMARY

The present invention is directed to a process for the preparation of a polyoxyalkylene polyol (P) having a functionality of 2 to 8 and a hydroxyl number of from 5 mg KOH/g polyol to 35 mg KOH/g polyol by reaction of H-functional starter substances $(S_i)$, $(S_c)$ and $(S_x)$ with one or more alkylene oxide(s) in the presence of a double metal cyanide catalyst (DMC). This process comprises (α) forming a starter mixture comprising the H-functional starter substance $(S_i)$, the H-functional starter substance $(S_x)$, and the double metal cyanide catalyst, and optionally, stripping the starter mixture under vacuum with nitrogen;

(γ) continuously adding (a) an alkylene oxide to the starter mixture of step (α);

and (δ) continuously adding the H-functional starter substance $(S_c)$;

wherein (i) the steps (γ) and (δ) either start simultaneously or step (γ) starts before step (δ);

(ii) the theoretical functionality of the H-functional starter substance $(S_i)$ is identical to the theoretical functionality of the polyoxyalkylene polyol (P) and the measured hydroxyl number of the H-functional starter substance $(S_i)$ is within 10% of the measured hydroxyl number of the polyoxyalkylene polyol (P);

(iii) the H-functional starter substance $(S_x)$ has an equivalent weight greater than or equal to 10 Da and less than or equal to 250 Da;

(iv) the H-functional starter substance $(S_c)$ has an equivalent weight of greater than or equal to 10 Da and less than or equal to 70 Da;

(v) in step (δ) the continuous addition of the H-functional starter substance $(S_c)$ proceeds until completion of the polyoxyalkylation with alkylene oxide, in which the initial feed rate ratio of the H-functional starter substance $(S_c)$ to alkylene oxide continues until from 30 to 95 weight percent of the total weight of alkylene oxide added in step (γ) has been added, then the feed rate ratio of H-functional starter substance $(S_c)$ to alkylene oxide is reduced to the final feed rate ratio of the H-functional starter substance $(S_c)$ to alkylene oxide, with the final feed rate ratio of the H-functional starter substance $(S_c)$ to alkylene oxide ranging from 50 to 5 (preferably 45 to 10, more preferably 40 to 15) percent of the initial feed rate ratio of the H-functional starter substance $(S_c)$ to alkylene oxide;

and (vi) the hydroxyl numbers are determined according to ASTM D4274-11.

The process of the invention may additionally comprise:
(β) adding an activation amount of (b) one or more alkylene oxide(s) to the starter mixture of step (α), wherein in step (γ) the continuous addition of (a) the alkylene oxide is to the mixture formed in (β); and (v) in step (δ) the continuous addition of the H-functional starter substance ($S_c$) proceeds until completion of the polyoxyalkylation with alkylene oxide, in which the initial feed rate ratio of the H-functional starter substance ($S_c$) to alkylene oxide continues until from 30 to 95 weight percent of the total weight of alkylene oxide added in steps (β) and (γ) has been added, and then reducing to a final feed rate ratio of the H-functional starter substance ($S_c$) to alkylene oxide that ranges from 50 to 5 (preferably 45 to 10, more preferably 40 to 15) percent of the initial feed rate ratio of the H-functional starter substance ($S_c$) to alkylene oxide.

The present invention also relates to a process for producing DMC catalyzed polyoxyalkylene polyols with narrow (i.e. symmetrical) molecular weight distributions and low viscosities, and provides an efficient process to make such polyoxyalkylene polyols by eliminating a dedicated low equivalent weight starter polyether polyol and only using a low equivalent weight starter substance mixed with a polyoxyalkylene polyether substance that has a similar hydroxyl number, functionality and composition of the product to be produced as the starter mixture. This may be referred to as a "product to product" process in which the starter mixture comprises the same product that is being prepared and a low equivalent weight starter substance. In addition, the novel process is sustainable (i.e. short cycle times, low quantities of catalyst, reduced energy consumption, etc.) and it forms a high quality polyol product (i.e. a product having a narrow molecular weight distribution and a low viscosity).

It is an object of the present invention to provide a process for the preparation of polyoxyalkylene polyols that exhibit good viscosity and polydispersity, without the need to produce and store the low equivalent weight starter polyether polyols used in the prior art.

DETAILED DESCRIPTION OF THE INVENTION

Figure 1:
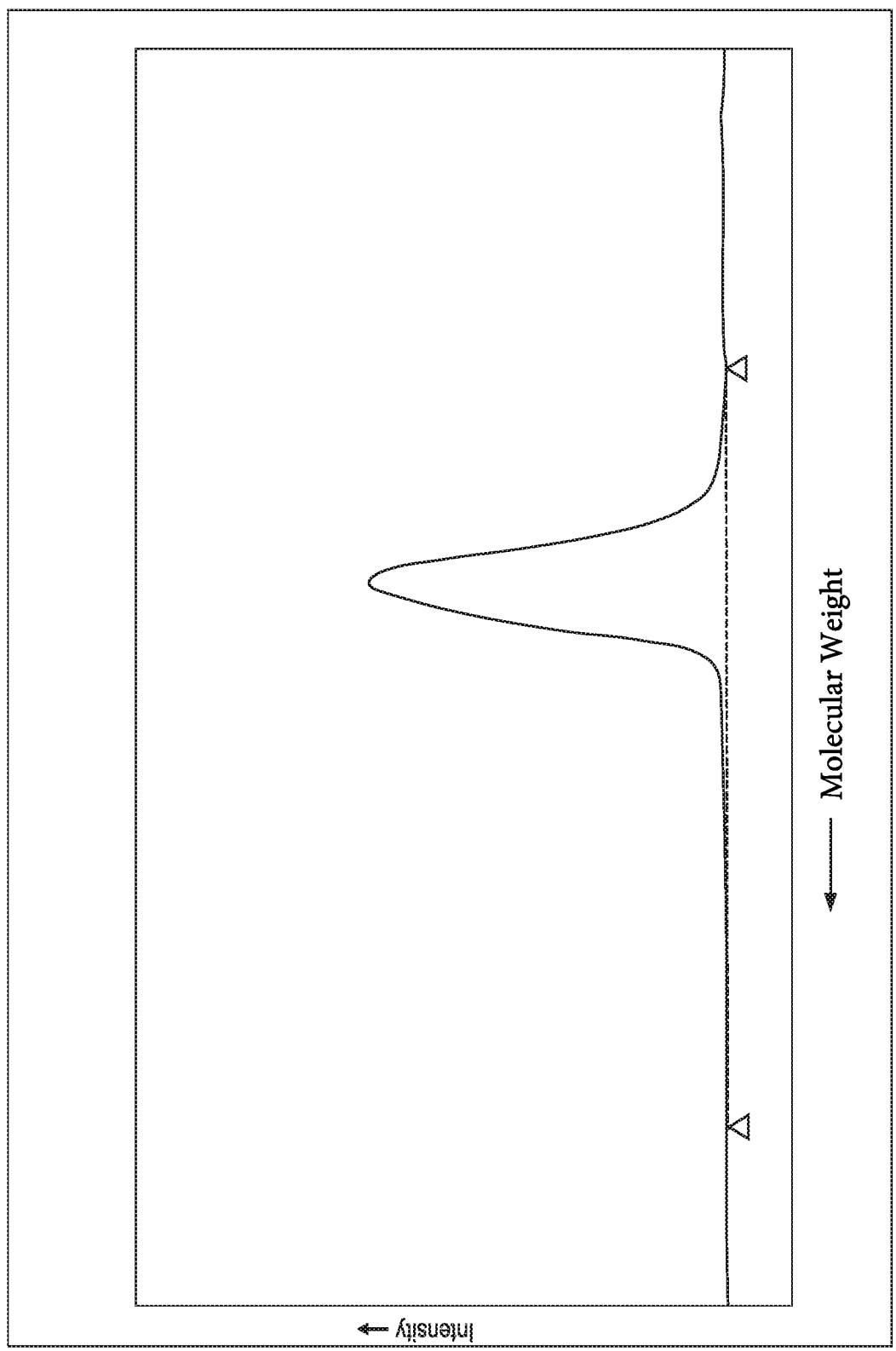
FIG. 1 is a GPC illustrating the molecular weight distribution of a product prepared by a prior art process with no pre-CAOS charge and a 5% non-CAOS cap.

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, as determined by GPC, unless indicated otherwise.

As used herein, hydroxyl number (OH number) was determined according to ASTM D4274-11, and was reported in mg [KOH]/g [polyol].

The viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB; 3 micron Pore diameter: 1× Mixed-E+5 micron Pore diameter: 2× Mixed-D), refractive index (RI) detection and calibrated with polyethylene glycol as the standard.

In accordance with the invention, the process comprises (α) forming a starter mixture comprising a H-functional starter substance ($S_i$), a H-functional starter substance ($S_x$) and a double metal cyanide catalyst, in which the starter mixture is optionally stripped under vacuum with nitrogen. This starter mixture is typically formed in a reactor. The portion of double metal cyanide catalyst and H-functional starter substances ($S_i$) and ($S_x$) is effective to initiate polyoxyalkylation of the starter mixture once an alkylene oxide is introduced into the reactor.

Suitable H-functional starter substances ($S_i$) to be used in accordance with the present invention include, for example, a polyoxyalkylene polyol which has a molecular weight that is approximately equal to the molecular weight of the product, i.e. the polyoxyalkylene polyol (P) that is being formed. In accordance with the invention, the theoretical functionality of the H-functional starter substance ($S_i$) is identical to the theoretical functionality of the polyoxyalkylene polyol (P) and the measured hydroxyl number of the H-functional starter substance ($S_i$) is within 10%, and preferably is within 5%, of the measured hydroxyl number of the polyoxyalkylene polyol (P). Thus, the H-functional starter substance ($S_i$) may have a functionality of 2 to 8, or preferably from 2 to 6, or more preferably from 2 to 3, and a OH number of from 5 to 35, or preferably from about 8 to 30, or more preferably from about 14 to about 28. In a preferred embodiment, the H-functional starter substance ($S_i$) is the same product (based on functionality and hydroxyl number) as the final targeted product. This embodiment achieves the objective of eliminating the need to produce a low equivalent weight starter polyether polyol and have a separate storage tank to store this material by using the finished product from a previous production batch as the H-functional starter substance ($S_i$) of the starter mixture (hence a product-to-product approach).

When the H-functional starter substance ($S_i$) of the starter mixture comprises a polyoxyalkylene polyol, this polyoxyalkylene polyol can be a known residual amount of the product left in the reactor from a prior batch of the same product. This polyoxyalkylene polyol may be prepared from the same reactants as the final product prepared by the process of the invention, have the same functionality, molecular weight and hydroxyl number as the final product resulting from the process of the present invention, and thus be essentially the same as the final product prepared by the instantly claimed process. The skilled artisan would, however, recognize that it is not actually the same product as the final product since it was prepared in a different lot or reactor batch. As an example, after completion of the production of a batch of polyoxyalkylene polyol in a reactor by DMC catalysis, 90% of the product is removed from the reactor. The remaining 10% of the polyoxyalkylene polyol product can be left in the reactor and used as the H-functional starter substance ($S_i$) of the starter mixture of the present invention. It is also possible that the H-functional starter substance ($S_i$) of the starter mixture can comprise a final polyoxyalkylene polyol product that is stored in a finished goods storage vessel from a previous campaign which can be brought back into the reactor as the H-functional starter substance ($S_i$) of the starter mixture. The H-functional starter substance ($S_i$) of the starter mixture can also comprise a final polyoxyalkylene polyol product that has a similar molecular weight as the target product that was made using basic catalysis (KOH or equivalent) and which was refined to remove or neutralize the basic catalyst. The use of a basic catalyzed and subsequently neutralized polyoxyalkylene product is necessary, for example, when using this product as the H-functional starter substance ($S_i$) for the initial or first production of the polyoxyalkylene polyol (P) product. Removal or neutralization of the basic catalyst from the final polyoxyalkylene polyol product to be used as the H-functional starter substance ($S_i$) is required, as those skilled in the art will recognize, because even trace amounts of base or alkalinity deactivates or inhibits the DMC catalyst present in the starter mixture. In all cases, when a polyoxyalkylene polyol is used as the H-functional starter substance ($S_i$), the polyoxyalkylene polyol acts as a reaction medium to provide the minimum starter charge required by the reactor configuration (e.g. cover agitator blade, fill recirculation loop, cover internal heating/cooling coils, etc.). In one embodiment, the polyoxyalkylene polyol which is used as the H-functional starter substance ($S_i$) of the starter mixture has the same molecular weight and alkylene oxide composition as the targeted final polyoxyalkylene polyol product (P). In one embodiment, the polyoxyalkylene polyol used as the H-functional starter substance ($S_i$) of the starter mixture does not substantially participate in the reaction. The minimization of the molecular weight growth of the H-functional starter substance ($S_i$) of the starter mixture which comprises a polyoxyalkylene polyol provides the opportunity to produce a final polyoxyalkylene polyol product (P) with a narrow molecular weight distribution and low viscosity. In one embodiment, this H-functional starter substance ($S_i$) of the starter mixture which comprises a polyoxyalkylene polyol contains double metal cyanide catalyst residuals. In one embodiment, the double metal cyanide catalyst residuals were previously exposed to alkylene oxide. In one embodiment, the double metal cyanide catalyst residuals of the polyoxyalkylene polyol which is used as the H-functional starter substance ($S_i$) of the starter mixture were previously exposed to alkylene oxide under reaction conditions ("pre-activated" catalyst).

The H-functional starter substance ($S_i$) comprising a polyoxyalkylene polyol can contain antioxidants and/or acids known to those skilled in the art. For example, suitable antioxidants for polyoxyalkylene polyols include sterically hindered phenolic compounds such as BHT (i.e. butylated hydroxytoluene), octadecyl 3-(3,5-ditert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), etc. Examples of suitable acids include any inorganic protic mineral acid or organic acid which is known to be suitable as described in the art. Phosphoric acid is an example of a suitable acid.

The H-functional starter substance ($S_i$) which may comprise a polyoxyalkylene polyol can be vacuum stripped with steam and/or nitrogen to remove any residual compounds introduced from the reaction or the raw materials. The stripping of the H-functional starter substance ($S_i$) can occur either before or after the addition of the H-functional starter substance ($S_x$). Stripping of the H-functional starter substance ($S_i$) can also occur either before or after the addition of the double metal cyanide catalyst.

Suitable compounds to be used as the low equivalent weight H-functional starter substances ($S_x$) have an equivalent weight of less than or equal to 250 Da, or preferably less than or equal to 70 Da, or more preferably less than or equal to 50 Da. The suitable compounds to be used as low equivalent weight H-functional starter substances ($S_x$) may also have an equivalent weight of greater than or equal to 10 Da, preferably greater than or equal to 20 Da, and more preferably greater than or equal to 30 Da. Thus, H-functional starter substances ($S_x$) may have an equivalent weight between any combination of these upper and lower values, such as, for example, of greater than or equal to 10 Da to less than or equal to 250 Da, or preferably of greater than or equal to 20 Da to less than or equal to 70 Da, or more preferably of greater than or equal to 30 Da to less than or equal to 50 Da. Suitable compounds, for example, include compounds that have a functionality of from 2 to 8, or preferably from 2 to 3. Some examples of suitable compounds to be used as the H-functional starter substance ($S_x$) include diols and triols such as, for example, ethylene glycol, propylene glycol, butylene glycol, glycerin, water, trimethylolpropane (TMP), sorbitol, sucrose and other low equivalent weight polyoxyalkylene polyols (which have an equivalent weight within the above range). In one embodiment, the low equivalent weight H-functional starter substance ($S_x$) of the starter mixture may be the same substance as the continuously fed H-functional starter substance ($S_c$).

The low equivalent weight H-functional starter substance ($S_x$) is added at a level from 0.1 to 2.0 weight percent (or from 0.25 to 1.75 weight percent, or from 0.5 to 1.5 weight percent) based on the weight of the polyoxyalkylene polyol H-functional starter substance ($S_i$) of the starter mixture of step ($\alpha$). The low equivalent weight H-functional starter substance ($S_x$) can be added to the reaction vessel before, after or simultaneously with the polyoxyalkylene polyol H-functional starter substance ($S_i$) of the starter mixture described above. The low equivalent weight H-functional starter substance ($S_x$) can be added to the reaction vessel before, after or simultaneously with the DMC catalyst. The low equivalent weight H-functional starter substance ($S_x$) can be added before or after the polyoxyalkylene polyol H-functional starter substance ($S_i$) and the DMC catalyst of the starter mixture is sparged with nitrogen under vacuum conditions. The low equivalent weight H-functional starter substance ($S_x$) must be added to the polyoxyalkylene polyol H-functional starter substance ($S_i$) and DMC catalyst before alkylene oxide is added to the reaction vessel. The presence of a low equivalent weight H-functional starter substance ($S_x$) in the starter mixture formed in ($\alpha$) is referred to as a "pre-CAOS" (Continuous Addition of Starter) charge.

Acid can be added to the low equivalent weight H-functional starter substance ($S_x$) before or after the low equivalent weight H-functional starter substance ($S_x$) is added to the reaction vessel. The acid may be any inorganic protic mineral acid or organic acid which is known to be suitable as described in the art. Typically, the amount of acid to be added to the low equivalent weight H-functional starter substance ($S_x$) ranges from 30 to 250 ppm, based on the weight of the low equivalent weight H-functional starter substance ($S_x$). Phosphoric acid is an example of a suitable acid.

Suitable double metal cyanide catalysts for the present invention include any DMC catalyst known in the art. The well-known DMC catalysts are typically the reaction product of a water-soluble metal salt (e.g. zinc chloride) and a water-soluble metal cyanide salt (e.g. potassium hexacyanocobaltate). The preparation of DMC catalysts is described in various references, including, for example, U.S. Pat. Nos. 5,158,922, 4,477,589, 3,427,334, 3,941,849, 5,470,813 and 5,482,908, the disclosures of which are herein incorporated by reference. Particular DMC catalysts that are preferred in some embodiments of the present invention are zinc hexacyanocobaltates. In one embodiment, the DMC catalysts are amorphous.

The DMC catalyst includes an organic complexing agent. As taught in the preceding references, the complexing agent is needed for an active catalyst. Preferred complexing agents include water-soluble heteroatom-containing organic compounds that can complex with the DMC compound. In one embodiment, the preferred complexing agents are water-soluble aliphatic alcohols. Tert-butyl alcohol is a preferred complexing agent for some embodiments. In addition to the organic complexing agent, the DMC catalyst may also include a polyether as is described in U.S. Pat. No. 5,482,908, the disclosure of which is herein incorporated by reference.

Preferred DMC catalysts for use in accordance with one or more embodiments of the present process are the highly active DMC catalysts such as are described in U.S. Pat. Nos. 5,482,908 and 5,470,813. High activity allows for the use of very low concentrations of the catalyst to be used. More specifically, the concentrations of catalyst required is typically low enough to overcome or eliminate any need to remove the catalyst from the finished polyoxyalkylene polyol products (P) formed in the process. In particular, the concentration of catalyst is typically in the range of from 10 ppm to 300 ppm, or from 20 ppm to 200 ppm, or from 30 ppm to 100 ppm, based on the final polyoxyalkylene polyol (P) weight.

The DMC catalyst can be added as a dry powder directly to the starter mixture or dispersed in an H-functional starter substance ($S_i$ or $S_x$ above) and added to the starter mixture. The DMC catalyst added to the starter mixture is the same as the DMC catalyst residual contained in the polyoxyalkylene polyol used as the H-functional starter substance ($S_i$) of the starter mixture. The DMC catalyst added to the starter mixture can be un-activated or fresh catalyst, i.e. catalyst that has not previously been exposed to alkylene oxide, catalyst that has been exposed to alkylene oxide under non-reaction conditions (i.e. temperature <90° C.); or "pre-activated" catalyst, i.e. catalyst that was previously exposed to alkylene oxide under reaction conditions (i.e. temperature 90° C.). The DMC catalyst residuals in the polyoxyalkylene polyol H-functional starter substance ($S_i$) of the starter mixture are considered "pre-activated" catalyst as this catalyst was exposed to alkylene oxides under reaction conditions during the making of the polyoxyalkylene polyol H-functional starter substance ($S_i$) of the starter mixture. The "pre-activated" catalyst in the polyoxyalkylene polyol H-functional starter substance ($S_i$) of the starter mixture is advantageous to the present invention to allow a rapid activation of the starter mixture when alkylene oxide is added and counter the known inhibitory effect of the low equivalent weight H-functional starter substance ($S_x$) that is present in the starter mixture. The combination of "pre-activated" catalyst from the polyoxyalkylene polyol H-functional starter substance ($S_i$) of the starter mixture and fresh or "pre-activated" catalyst added to the starter mixture also insures a good reaction (i.e. no rapid pressure increase or temperature fluctuations) when the continuously added H-functional starter substance ($S_c$) is added. The DMC catalyst added to the starter mixture can be the same as or different from the residual catalyst or "pre-activated" catalyst in the polyoxyalkylene polyol H-functional starter substance ($S_i$) of the starter mixture.

The DMC catalyst (which may be fresh catalyst or pre-activated catalyst) is typically added to the starter mixture. It can, however, also be split between the starter mixture and the continuously added H-functional starter substance ($S_c$). Splitting the DMC catalyst and feeding the DMC catalyst continuously with the H-functional starter substance ($S_c$) provides a lower initial catalyst concentration in the starter mixture, and a more uniform catalyst concentration during the production of the polyoxyalkylene polyol product (P).

In the process of the present invention, the DMC catalyst present in the starter mixture is activated in the presence of alkylene oxide. Activation of the DMC catalyst present in the starter mixture occurs by optionally (β) adding an activation amount of (b) an alkylene oxide to the starter mixture formed in (α). The alkylene oxide for the activation of the starter mixture can be added all at once to the starter ($S_i$, $S_x$ and DMC catalyst) mixture of step (α) wherein the pressure in the reactor system will increase rapidly or the alkylene oxide can be slowly added during the initial ramp-up of the alkylene oxide feed wherein the pressure in the reactor system will increase slowly. The activation of the DMC catalyst present in the starter mixture is detected when the pressure decreases to half of the amount of the peak pressure detected in the case of the rapid addition of the alkylene oxide, or when the pressure begins to decrease and the reactor system begins to cool the reaction (indicating the presence of a reaction) in the case of slow addition of the alkylene oxide. The amount of alkylene oxide added for activation is from 1 to 12 weight percent based on the amount of the H-functional starter substance ($S_i$) present in the starter mixture. As used herein, the amount of alkylene oxide necessary to activate the DMC catalyst present in the starter mixture of step (α) may be referred to as the "initial" or "activation" alkylene oxide.

The low equivalent weight H-functional starter substance ($S_x$) is present to react with the activation amount of (b) an alkylene oxide which is added in step (β) to the starter mixture of step (α) during the activation of the DMC catalyst or with (a) the alkylene oxide during the initial ramp-up of the continuous addition of alkylene oxide in step (γ) before (δ) the continuous addition of the continuously added H-functional starter substance ($S_c$) is started. The reaction of the low equivalent weight H-functional starter substance ($S_x$) with the activation or initial amount of alkylene oxide which is added before the continuous addition of the H-functional starter substance ($S_c$) is started in step (δ) prevents the polyoxyalkylene polyol used as the H-functional starter substance ($S_i$) of the starter mixture from reacting with this activation or initial amount of alkylene oxide and increasing the polydispersity of the final polyoxyalkylene polyol product (P). The low equivalent weight H-functional starter substance ($S_x$) must be added to the starter mixture in an amount sufficient to react with the activation and/or initial alkylene oxide (i.e. before starting (δ) the continuous addition of the H-functional starter substance ($S_c$)) and limits the increase in the polydispersity and viscosity of the final polyoxyalkylene polyol (P) product due to the reaction of the activation and/or initial amount of alkylene oxide with the polyoxyalkylene polyol H-functional starter substance ($S_i$) of the starter mixture. However, addition of too much of the low equivalent weight H-functional starter substance ($S_x$) will result in no reaction or a sluggish reaction of the activation and/or initial amount of alkylene oxide, and may inhibit the DMC catalyst in a way that results in production of a low quality product (i.e. a product having a high polydispersity and a high viscosity). The skilled artisan knows and understands that the lowest equivalent weight substance preferably reacts with alkylene oxide in the presence of DMC catalyst, hence the low equivalent weight H-functional starter substance ($S_x$) will preferentially react with the activation and/or initial amount of alkylene oxide present. This is commonly known and referred to by one of ordinary skill in the art as "catch up kinetics". Catch up kinetics is described in "Chemistry and Technology of Polyols for Polyurethanes", $2^{nd}$ Edition, Volume 1, 2016, M. Ionescu, pages 189-190, the disclosure of which is herein incorporated by reference.

The process of the invention additionally comprises step (γ) continuously adding (a) an alkylene oxide to the mixture of step (β) when step (β) is present or to the mixture of step (α) when step (β) is not present. This continuous addition comprises starting and increasing the addition of alkylene oxide in a steady manner until the final target feed rate of alkylene oxide is reached. The ramp-up of the alkylene oxide feed(s) typically takes from 5 to 35 minutes before reaching the final target feed rate(s).

Suitable alkylene oxides to be used as alkylene oxides (a) and/or (b) in accordance with the invention include, but are not limited to, compounds such as ethylene oxide, propylene oxide, 1,2- and 2,3-butylene oxide, isobutylene oxide, epichlorohydrin, cyclohexene oxide, and styrene oxide. In addition to the alkylene oxide block(s), carbon dioxide can be added in combination with the alkylene oxide(s) to form polyether carbonate polyols. The alkylene oxide(s) used as component (a) and/or (b) in the invention may be the same or different.

In accordance with the invention, the process additionally comprises (δ) continuously adding a H-functional starter substance ($S_c$).

Suitable compounds to be used as the continuously added H-functional starter substance ($S_c$) include, for example, compounds which have a (nominal) hydroxyl functionality of at least about 2 up to about 8, or preferably from about 2 to about 3, and which have an equivalent weight of greater than or equal to 10 Da, or of at least 30 Da, and an equivalent weight of less than or equal to 70 Da, or preferably of less than or equal to about 50 Da. Thus, the H-functional starter substances ($S_c$) may have an equivalent weight ranging between any combination of these upper and lower values, such as, for example, of greater than or equal to 10 Da to less than or equal to 70 Da, or preferably from about 30 Da to about 50 Da. Suitable compounds to be used as the continuously added H-functional starter substance ($S_c$) herein, include compounds such as, for example, but are not limited to, ethylene glycol, propylene glycol, butylene glycol, water, glycerin, trimethylolpropane, sorbitol, sucrose, etc. Mixtures of monomeric initiators or their oxyalkylated oligomers may also be utilized. The continuously added H-functional starter substance ($S_c$) can be the same as or different from the low equivalent weight H-functional starter substance ($S_x$) of the starter mixture formed in step (α).

In an embodiment of the invention, the continuously added H-functional starter substance ($S_c$) is selected from propylene glycol and/or glycerin. In one embodiment, the continuously added H-functional starter substance ($S_c$) is the same as the low equivalent weight H-functional starter substance ($S_x$) in the starter mixture. In one embodiment, the weight of the continuously added H-functional starter substance ($S_c$) is greater than 50 weight percent of the total combined weight of the continuously added H-functional starter substance ($S_c$) and the low equivalent weight H-functional starter substance ($S_x$), which can be represented as: ($S_c/(S_c+S_x)$>50%). This embodiment provides for sufficient continuously added H-functional starter substance ($S_c$) to provide good exchange on the catalyst surface that is necessary for good product quality (i.e. viscosity and molecular weight distribution).

The continuously added H-functional starter substances ($S_c$) can be acidified with a small amount of a suitable acid as described in, for example, U.S. Pat. Nos. 6,077,978 and 7,919,575. The acid may be any inorganic protic mineral acid or organic acid which is known to be suitable as described in the art. Typically, the amount of acid to be added to the continuously added H-functional starter substance ($S_c$) ranges from 30 to 250 ppm, based on the weight of the continuously added H-functional starter substance ($S_c$). In one embodiment, the continuously added H-functional starter substance ($S_c$) contains from 120 to 240 ppm of acid. Phosphoric acid is an example of a suitable acid.

In the process of the present invention, in step (δ) the continuous addition of H-functional starter substance ($S_c$) is started and may be ramped simultaneously with the continuously added alkylene oxide in step (γ). The continuously added H-functional starter substance ($S_c$) is started before 4 weight percent (preferably before 2 weight percent) of the total weight of alkylene oxides from step (γ) or from steps (β) and (γ) is fed, including the weight of alkylene oxides fed to activate the DMC catalyst present in the starter mixture.

In accordance with the invention, the polyoxyalkylation of the H-functional starter substances ($S_i$, $S_x$ and $S_c$) with the alkylene oxides from step (γ) and optionally from step (β) is completed to form a polyoxyalkylene polyol (P) having a functionality of from 2 to 8 and an OH number of from about 5 to 35. The polyoxyalkylene polyols (P) formed by the process of the present invention typically have functionalities of from 2 to 8, or preferably from 2 to 6, or more preferably from 2 to 3, and OH numbers of from about 5 to 35, or preferably from about 8 to 30, or more preferably from about 14 to about 28.

In the process of the present invention, (i) the steps (γ) and (δ) either start simultaneously or step (γ) starts before step (δ); (ii) the theoretical functionality of the H-functional starter substance ($S_i$) is identical to the theoretical functionality of the polyoxyalkylene polyol (P) and the measured hydroxyl number of the H-functional starter substance ($S_i$) is within 10%, or preferably within 5%, of the measured hydroxyl number of the polyoxyalkylene polyol (P); (iii) the H-functional starter substance ($S_x$) has an equivalent weight of greater than or equal to 10 Da and less than or equal to 250 Da, or preferably of greater than or equal to 20 Da and less than or equal to 70 Da, or more preferably of greater than or equal to 30 Da to less than or equal to 50 Da; (iv) the H-functional starter substance ($S_c$) has an equivalent weight of greater than or equal to 10 Da and less than or equal to 70 Da; (v) in step (δ) the continuous addition of the H-functional starter substance ($S_c$) proceeds until completion of the polyoxyalkylation with alkylene oxide, in which the initial feed rate ratio of the continuously added H-functional starter substance ($S_c$) to alkylene oxide continues until from 30 to 95 weight percent of the total weight of alkylene oxide is added to the reactor, and then the feed rate ratio of the continuously added H-functional starter substance ($S_c$) to alkylene oxide is reduced to the final feed rate ratio of the continuously added H-functional starter substance ($S_c$) to alkylene oxide wherein the final feed rate ratio ranges from 50 to 5 (preferably 45 to 10, more preferably 40 to 15) percent of the initial feed rate ratio of the continuously added H-functional starter substance ($S_c$) to alkylene oxide(s); and (vi) the hydroxyl numbers are determined according to ASTM D4274-11.

Figure 4:
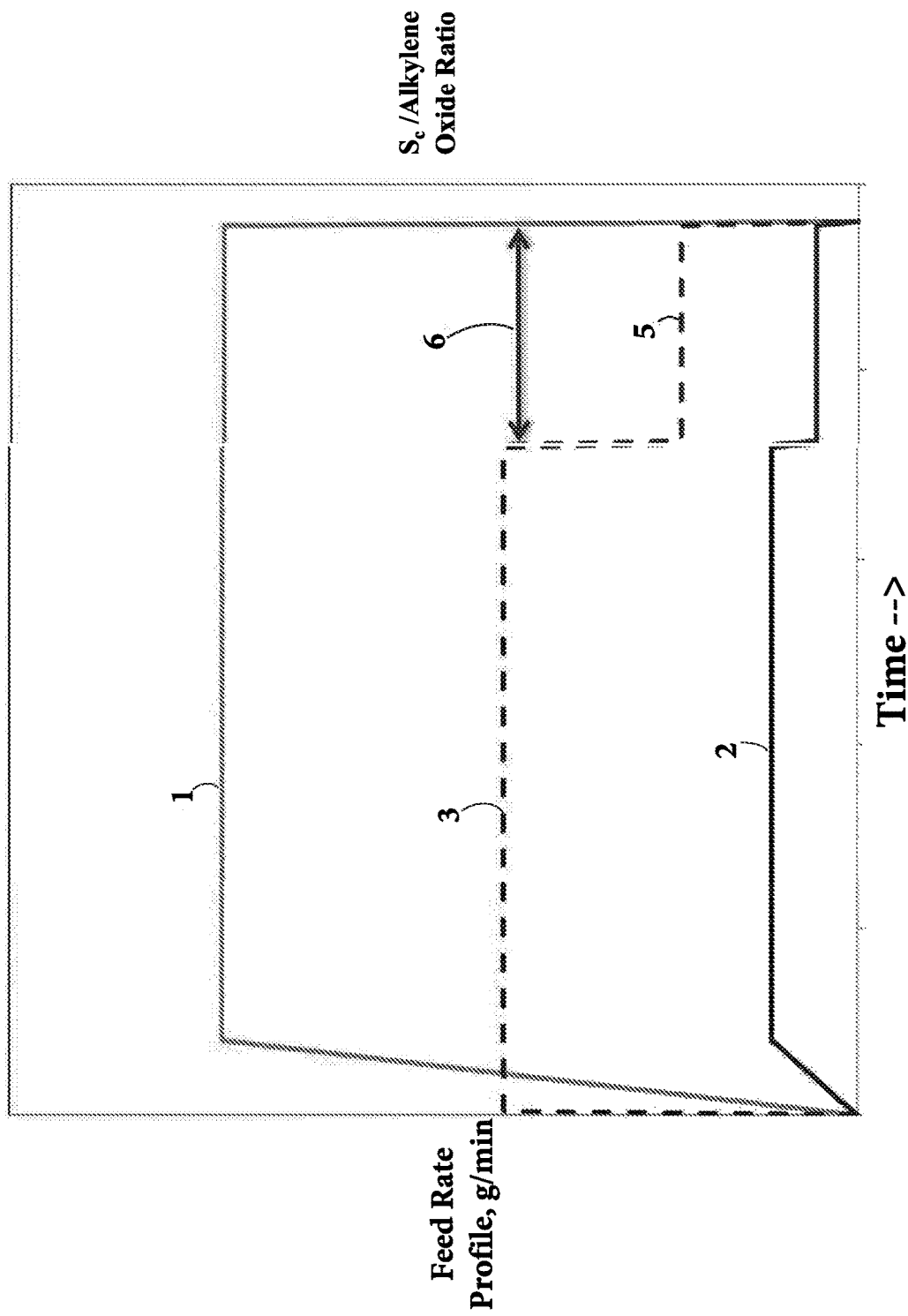
FIG. 4 is an illustration of the $S_c$ and alkylene oxide feed rate profiles in which a low-CAOS cap process is used to make a polyoxyalkylene polyol. This Figure illustrates that the $S_c$ feed rate and, hence, the $S_c$/alkylene oxide feed rate ratio is decreased during the making of the polyoxyalkylene polyol and that the $S_c$ feed continues until the end of the alkylene oxide feed, hence the product is finished with a low-CAOS cap. In other words, a lower feed rate ratio of continuously added H-functional starter substance ($S_c$) to alkylene oxide is added at the end of the alkylene oxide feed compared to the feed rate ratio of continuously added H-functional starter substance ($S_c$) to alkylene oxide that is added at the beginning of the continuously added H-functional starter substance ($S_c$) feed.

In the process of the present invention, (v) in step (δ) the continuous addition of the continuously added H-functional starter substance ($S_c$) proceeds until completion of the polyoxyalkylation with alkylene oxide. The addition of the continuously added H-functional starter substance ($S_c$) is completed by reducing the feed rate ratio of the continuously added H-functional starter substance ($S_c$) to alkylene oxide at the end of step (δ). The final feed rate ratio of the continuously added H-functional starter substance ($S_c$) to alkylene oxide ranges from 50 to 5 percent of the initial feed rate ratio of the continuously added H-functional starter substance ($S_c$) to alkylene oxide. The instantaneous feed rate ratio, referred to herein as the feed rate ratio, of continuously added H-functional starter substance ($S_c$) to alkylene oxide is defined as the feed rate of the continuously added H-functional starter substance ($S_c$) fed over the feed rate of the alkylene oxide. The initial feed rate ratio of the continuously added H-functional starter substance ($S_c$) to alkylene oxide is defined as the feed rate of the continuously added H-functional starter substance ($S_c$) over the feed rate of the alkylene oxide fed before the feed rate of the continuously added H-functional starter substance ($S_c$) is decreased. The final feed rate ratio of the continuously added H-functional starter substance ($S_c$) to alkylene oxide is defined as the feed rate of the continuously added H-functional starter substance ($S_c$) over the feed rate of the alkylene oxide fed at the decreased feed rate of the continuously added H-functional starter substance ($S_c$). This reduction of the initial feed rate ratio to the final feed rate ratio results in a low-CAOS cap being formed on the polyoxyalkylene polyol product (P) as illustrated by FIG. 4. More specifically, FIG. 4. Illustrates how the feed rate profiles of the alkylene oxide and the H-functional starter substance ($S_c$) change during the process to form a low CAOS cap on the polyoxyalkylene polyol product (P). In FIG. 4, 1 represents the feed rate (in g/min) profile of the alkylene oxide, 2 represents the feed rate (in g/min) profile of the H-functional starter substance ($S_c$), 3 represents the initial feed rate ratio of the H-functional starter substance ($S_c$) to alkylene oxide which is added until the specified amount (i.e. from 30 to 95 weight percent) of the alkylene oxide is added to the reactor, 5 represents the final feed rate ratio of the H-functional starter substance ($S_c$) to alkylene oxide which is reduced to a specified amount (i.e. from 50 to 5 percent) of the initial feed rate ratio, thus forming a low-CAOS cap on the final polyoxyalkylene polyol product (P), 6 represents the low-CAOS cap which is formed at the end of the process by adding a reduced feed rate ratio of the H-functional starter substance ($S_c$) to alkylene oxide.

An alternate method to determine the ratio of the continuously added H-functional starter substance ($S_c$) to alkylene oxide is to use the weight of the continuously added H-functional starter substance ($S_c$) over the weight of the alkylene oxide fed at a constant ratio. The initial weight ratio of the continuously added H-functional starter substance ($S_c$) to alkylene oxide is defined as the weight of the H-functional starter substance ($S_c$) over the weight of the alkylene oxide fed from the start of the continuously added H-functional starter substance ($S_c$) until the feed rate of the continuously added H-functional starter substance ($S_c$) is decreased. The final weight ratio of the continuously added H-functional starter substance ($S_c$) to alkylene oxide is defined as the weight of the H-functional starter substance ($S_c$) over the weight of the alkylene oxide fed at the reduced feed rate conditions of the continuously added H-functional starter substance ($S_c$) until the end of the continuously added H-functional starter substance ($S_c$).

Figure 3:
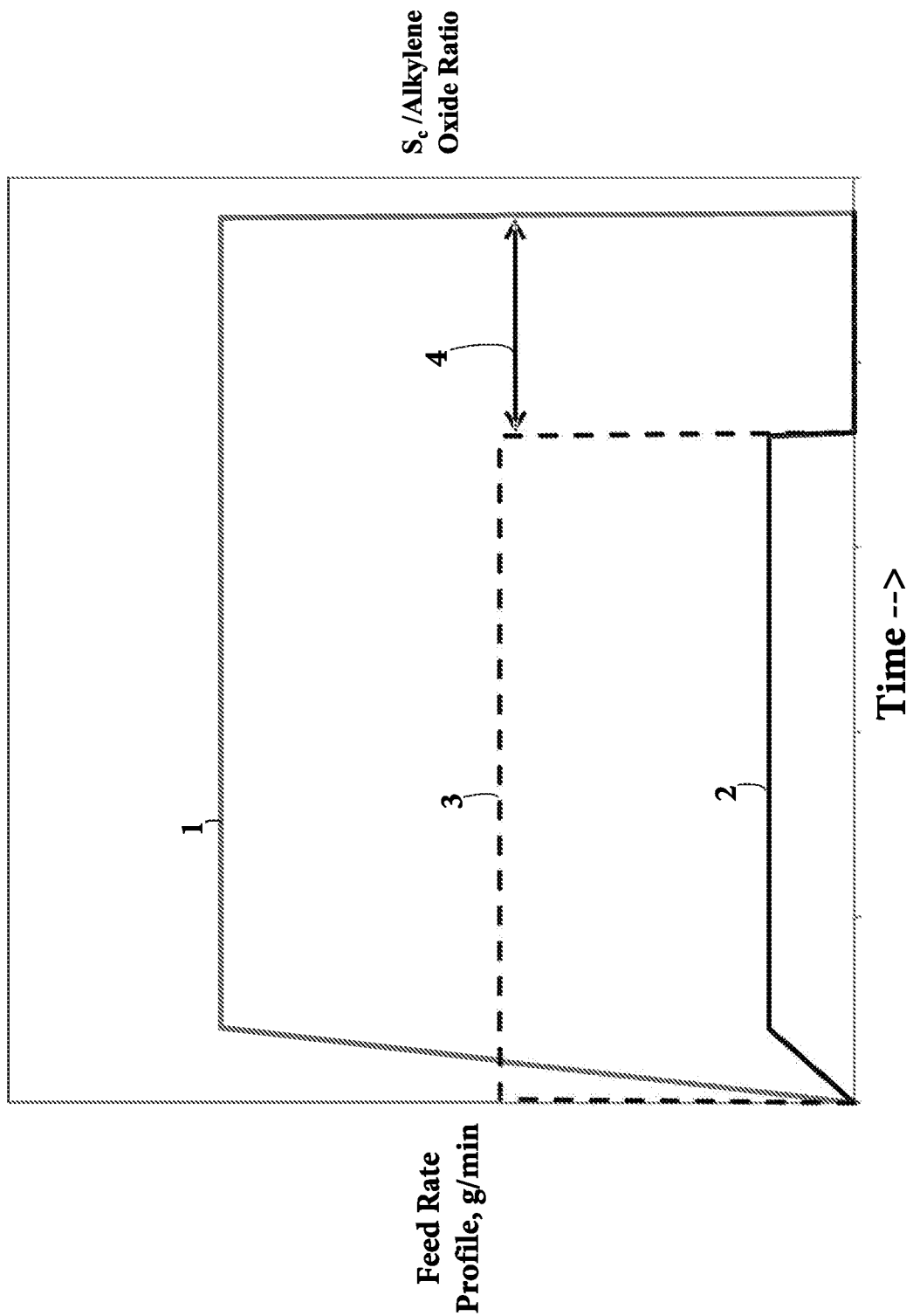
FIG. 3 is an illustration of the $S_c$ and alkylene oxide feed rate profiles in which a non-CAOS cap process is used to make a polyoxyalkylene polyol. This Figure illustrates that the $S_c$/alkylene oxide feed rate ratio is constant during the making of the product and once all of the continuously added H-functional starter substance ($S_c$) is fed, the product is finished with a non-CAOS cap. In other words, alkylene oxide is added at the end of the process with no continuously added H-functional starter substance ($S_c$).

Feeding alkylene oxide at the end of the reaction with no continuously added H-functional starter substance ($S_c$) is referred to as a "non-CAOS" cap. Feeding the continuously added H-functional starter substance ($S_c$) at a constant ratio until 100% of the target alkylene oxide is added means that there is a 0% "non-CAOS" cap of the product. The term "non-CAOS" cap is defined as the amount of alkylene oxide fed at the end of the batch with no continuously added H-functional starter substance ($S_c$), divided by the total batch weight. FIG. 3 illustrates a non-CAOS cap process. More specifically, FIG. 3. Illustrates how the feed rate profiles of the alkylene oxide and the H-functional starter substance ($S_c$) change during the process to form a non-CAOS cap on the polyoxyalkylene polyol product (P). In FIG. 3, 1 represents the feed rate (in g/min) profile of the alkylene oxide, 2 represents the feed rate (in g/min) profile of the H-functional starter substance ($S_c$), 3 represents the feed rate ratio of the H-functional starter substance ($S_c$) to alkylene oxide which is added until all of the H-functional starter substance ($S_c$) has been added, and 4 represents the non-CAOS cap which is formed at the end of the process by adding alkylene oxide with no continuously added H-functional starter substance ($S_c$). In other words, when alkylene oxide is added at the end of the process with no continuously added H-functional starter substance ($S_c$), a non-CAOS cap is formed on the polyoxyalkylene polyol product (P).

The process of using a final, reduced feed rate ratio of the continuously added H-functional starter substance ($S_c$) to alkylene oxide at the end of the batch is referred to as a "low-CAOS" cap (See FIG. 4). The "low-CAOS" cap ratio or percentage is defined as the amount of alkylene oxide fed at the final reduced feed rate ratio conditions, divided by the total batch weight. In this aspect of the invention, the initial feed rate ratio of the continuously added H-functional starter substance ($S_c$) to alkylene oxide is higher than the final feed rate ratio of the continuously added H-functional starter substance ($S_c$) to alkylene oxide. The change or reduction of the feed rate ratio of the continuously added H-functional starter substance ($S_c$) to alkylene oxide in the "low-CAOS" cap process occurs when from 30 to 95 weight percent of the total weight of alkylene oxide added in step (γ) or in steps (β) and (γ), when (β) is present, has been added. The final feed rate ratio of the continuously added H-functional starter substance ($S_c$) to alkylene oxide is less than the initial feed rate ratio of the continuously added H-functional starter substance ($S_c$) to alkylene oxide. The feeding of a low ratio of continuously added H-functional starter substance ($S_c$) to alkylene oxide at the end of the batch fosters exchange on the catalyst surface at the end of the batch when the hydroxyl concentration is low and results in products that have narrow molecular weight distributions and low viscosities. The "low-CAOS" cap helps prevent the molecular weight distribution skewing to higher molecular weights and helps maintain a symmetrical distribution. The decreased rate or amount of continuously added H-functional starter substance ($S_c$) added toward the end of the alkylene oxide feed, surprisingly also does not skew the molecular weight distribution to the lower molecular weight side as would be expected with a 0% "non-CAOS" cap provided that the final feed rate ratio of the continuously added H-functional starter substance ($S_c$) to alkylene oxide is 50 to 5 percent of the initial feed rate ratio of the continuously added H-functional starter substance ($S_c$) to alkylene oxide. This "low CAOS" cap is particularly beneficial in the preparation of polyoxyalkylene polyol products (P) that have an equivalent weight equal to or greater than 4000, as the amount of continuously added H-functional starter substance ($S_c$) required for the production of these products is low and the tendency to make higher viscosity products increases.

In one embodiment of the present invention, the final feed rate ratio of the continuously added H-functional starter substance ($S_c$) to alkylene oxide is less than 1.0% ((feed rate of H-functional starter substance ($S_c$) fed during the final feed rate ratio/feed rate of alkylene oxide fed during the final feed rate ratio)*100). In another embodiment of the present invention, the weight of the continuously added H-functional starter substance ($S_c$) added at the final feed rate ratio is >1.0% of the total combined weight of the continuously added H-functional starter substance ($S_c$) and of the H-functional starter substance ($S_x$) (i.e. (weight of $S_c$ added at final feed rate ratio/total combined weight of $S_c$+weight of $S_x$)*100). These embodiments ensure that a sufficient amount of continuously added H-functional starter substance ($S_c$) is present to facilitate the exchange on the catalyst surface but limits the final feed rate ratio to prevent skewing of the molecular weight distribution.

In accordance with an embodiment of the present invention, the "low-CAOS" cap can be followed by a "non-CAOS" cap.

In accordance with the invention, in step (δ) when the continuously added H-functional starter substance ($S_c$) is added to the reaction mixture, alkylene oxide must be simultaneously added with the continuously added H-functional starter substance ($S_c$). During the addition of the continuously added H-functional starter substance ($S_c$), if, for any reason, the feed of the continuously added H-functional starter substance ($S_c$) or the alkylene oxide is interrupted and stops, the other feed must stop as well. Upon restarting after a feed interruption, these two feeds must start and be ramped up simultaneously. Feeding the alkylene oxide feed with no continuously added H-functional starter substance ($S_c$), prior to a non-CAOS cap, can significantly alter the molecular weight distribution and increase the product viscosity, even if the correct amount of continuously added H-functional starter substance ($S_c$) is added later in the batch (so the correct hydroxyl number or equivalent weight is attained). Feeding the continuously added H-functional starter substance ($S_c$) with no alkylene oxide can cause DMC catalyst reactivity issues when the alkylene oxide feed is restarted, including DMC catalyst deactivation and/or temperature excursions leading to undesirable changes to the molecular weight distribution and viscosity.

In accordance with the present invention, the process is typically carried out in a stainless steel reaction vessel (e.g. 35 Liter or larger) equipped with an electrically heated jacket and an internal coil that can be used for heating or cooling the reaction mixture. Steam, water or a combination of the two can be passed through cooling coil to control the reaction temperature. Tempered water or a hot oil system can also be used to control the temperature. The reactor system includes a mechanical agitator that can be equipped with a single agitating device such as a gate-type mixer or an anchor type mixer or other such devices known to those skilled in the art. The agitator could also be equipped with one or multiple mixers such as pitched blade impeller, Rushton-type impeller, flat blade, curved blade, tilted blade or other such devices known to those skilled in the art. The blades can be used individually or in combination. The agitator speed can be constant or varied during the batch. The reactor internals may include baffles. The reactor can also be equipped with a recirculation pump loop that withdraws the reaction mixture from the bottom portion of the reactor and pumps the reaction mixture back into the reactor through a dip tube or spray nozzle in the upper part of the reactor or through a dip tube or sparge ring at the bottom part of the reactor. The recirculation loop can include a heat exchanger for temperature control or can include a static mixing device. The reactor and associated metering and monitoring equipment are connected to a digital process control system.

The reactor system includes an alkylene oxide dosing system for one or more alkylene oxide feeds (e.g. propylene and/or ethylene oxide). When more than one alkylene oxide is used, the alkylene oxides can be introduced to the reactor together or separately. They can be mixed and fed in together, or they can be stored separately and mixed using a static mixing device before being introduced to the reactor. The alkylene oxides can be introduced into the headspace of the reactor through a dip tube or spray nozzle or into the liquid phase in the reactor through a dip tube or sparge ring. The mixing impellers can be optimized to match the location of alkylene oxide addition to provide a high shear/mixing zone near the alkylene oxide injection location. The alkylene oxides can also be introduced to the recirculation line directly or via a static mixing device.

The reactor system includes a dosing system for the continuously added H-functional starter substance ($S_c$). When more than one continuously added H-functional starter substances ($S_c$) are used, these can be introduced to the reactor together or separately. They can be mixed and fed in together, or they can be stored separately and mixed using a static mixing device before being introduced to the reactor. The continuously added H-functional starter substances ($S_c$) can be introduced into the headspace of the reactor through a dip tube or spray nozzle or into the liquid phase in the reactor through a dip tube or sparge ring. The mixing impellers can be optimized to match the location of continuously added H-functional starter substances ($S_c$) addition point to provide a high shear/mixing zone near the continuously added H-functional starter substance ($S_c$) injection location. The continuously added H-functional starter substance ($S_c$) can also be introduced to the recirculation line directly or via a static mixing device. The continuously added H-functional starter substance ($S_c$) can also be premixed with the alkylene oxide and introduced to the reactor directly via a dip tube or sparge ring or via a static mixing device. The alkylene oxide feeds can be dosed over a range of 0.25 hours to 20 hours depending on the reactor configuration (mixing) and heat removal capabilities.

The finished polyoxyalkylene polyol product (P) of the present invention containing residual DMC catalysts can be vacuum stripped with steam and/or nitrogen to remove any residual compounds introduced from the reaction or the raw materials. The finished polyoxyalkylene polyol product (P) is also typically inhibited with antioxidants known to the skilled artisan. Examples of suitable antioxidants for polyether polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201) or other equivalent antioxidants or inhibitors. The finished polyoxyalkylene polyol product (P) may also be acidified with any inorganic protic mineral acid or organic acid which is known to be suitable as described in the art. The finished polyoxyalkylene polyol product (P) is preferably inhibited with an antioxidant prior to steam and/or nitrogen stripping. Additional inhibitor can be added after the stripping, with or without steam and/or nitrogen, and any acid addition, if required, is preferably added after the stripping, with or without steam and/or nitrogen. The final inhibitor and/or acid can be added directly to the stripping vessel, or to the storage vessel, or can be continuously added to the product in the transfer line between the stripping vessel and the storage vessel. Alternatively, the polyoxyalkylene polyol product (P) can be stored with only antioxidant and any required acid can be added to the storage vessel prior to shipment or to the shipping container, either directly to the container or added continuously to the transfer line between the storage vessel and the shipping container or prior to the final product use.

In a first embodiment, the invention is directed to a process for the preparation of a polyoxyalkylene polyol (P) having a functionality of 2 to 8 and a hydroxyl number of from 5 mg KOH/g to 35 mg KOH/g by reaction of H-functional starter substances ($S_i$), ($S_c$) and ($S_x$) with an alkylene oxide in the presence of a double metal cyanide catalyst (DMC), comprising (α) forming a starter mixture comprising said H-functional starter substances ($S_i$) and ($S_x$), and said double metal cyanide catalyst, and optionally, stripping the starter mixture under vacuum with nitrogen; (γ) continuously adding (a) an alkylene oxide to the starter mixture of step (α); and (δ) continuously adding said H-functional starter substance ($S_c$); wherein (i) the steps (γ) and (δ) either start simultaneously or step (γ) starts before step (δ); (ii) the theoretical functionality of said H-functional starter substance ($S_i$) is identical to the theoretical functionality of said polyoxyalkylene polyol (P) and the measured hydroxyl number of said H-functional starter substance ($S_i$) is within 10% of the measured hydroxyl number of said polyoxyalkylene polyol (P); (iii) the H-functional starter substance ($S_x$) has an equivalent weight greater than or equal to 10 Da and less than or equal to 250 Da; (iv) the H-functional starter substance ($S_c$) has an equivalent weight of greater than or equal to 10 Da and less than or equal to 70 Da; (v) in (δ) the continuous addition of the H-functional starter substance ($S_c$) proceeds until completion of the polyoxyalkylation with alkylene oxide, in which the initial feed rate ratio of the H-functional starter substance ($S_c$) to alkylene oxide continues until from 30 to 95 weight percent of the total weight of alkylene oxide in step (γ) has been added, then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 50 to 5 percent of the initial feed rate ratio of the H-functional starter substance ($S_c$) to alkylene oxide; and (vi) said hydroxyl numbers are determined according to ASTM D4274-11.

In a second embodiment, the invention is directed to the process according to first embodiment additionally comprising (β) adding an activation amount of (b) an alkylene oxide to the starter mixture of step (α), wherein in step (γ) the continuous addition of (a) alkylene oxide is to the mixture formed in (β); and (v) in step (δ) the continuous addition of said H-functional starter substance ($S_c$) proceeds until completion of the polyoxyalkylation with alkylene oxide, in which the initial feed rate ratio of the H-functional starter substance ($S_c$) to alkylene oxide continues until from 30 to 95 weight percent of the total weight of alkylene oxide in steps (δ) and (γ) has been added, and then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 50 to 5 percent of the initial feed rate ratio of the H-functional starter substance ($S_c$) to alkylene oxide.

In a third embodiment, the invention is directed to the process according to one of the first or second embodiments wherein (ii) the theoretical functionality of the H-functional starter substance ($S_i$) is identical to the theoretical functionality of the polyoxyalkylene polyol (P) and the measured hydroxyl number of the H-functional starter substance ($S_i$) is within 5% of the measured hydroxyl number of the polyoxyalkylene polyol (P).

In a fourth embodiment, the invention is directed to the process according to one of the first or third embodiments wherein (v) in step (δ), the continuous addition of the H-functional starter substance ($S_c$) proceeds until completion of the polyoxyalkylation with alkylene oxide, in which the initial feed rate ratio of the H-functional starter substance ($S_c$) to alkylene oxide continues until from 30 to 95 weight percent of the total weight of alkylene oxide in step (γ) has been added, then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 45 to 10 percent, preferably from 40 to 15 percent, of the initial feed rate ratio of the H-functional starter substance ($S_c$) to alkylene oxide.

In a fifth embodiment, the invention is directed to the process according to one of the second or third embodiments wherein (v) in step (δ), the continuous addition of the H-functional starter substance ($S_c$) proceeds until completion of the polyoxyalkylation with alkylene oxide, in which the initial feed rate ratio of the H-functional starter substance ($S_c$) to alkylene oxide continues until from 30 to 95 weight percent of the total weight of alkylene oxide in steps (δ) and (γ) has been added, and then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 45 to 10 percent, preferably from 40 to 15 percent, of the initial feed rate ratio of the H-functional starter substance ($S_c$) to alkylene oxide.

In a sixth embodiment, the invention is directed to the process according to one of the first to the fifth embodiments wherein the H-functional starter substance ($S_i$) has a functionality of about 2 to about 8 and a hydroxyl number of 5 to 35, preferably a functionality of from 2 to 6 and a hydroxyl number of 8 to 30, more preferably a functionality of 2 to 3 and a hydroxyl number of 14 to 28.

In a seventh embodiment, the invention is directed to the process according to one of the first to the sixth embodiments in which the H-functional starter substance ($S_i$) comprises a polyoxyalkylene polyol containing double metal cyanide catalyst residuals.

In an eighth embodiment, the invention is directed to the process according to one of the first to the seventh embodiments in which the H-functional starter substance ($S_i$) comprises a polyoxyalkylene polyol containing double metal cyanide catalyst residuals wherein the double metal cyanide catalyst residuals were previously exposed to alkylene oxide.

In a ninth embodiment, the invention is directed to the process according to one of the first to the eighth embodiments in which the H-functional starter substance ($S_i$) comprises a polyoxyalkylene polyol containing double metal cyanide catalyst residuals wherein the double metal cyanide catalyst residuals comprise a pre-activated double metal cyanide catalyst which was previously exposed to alkylene oxide under reaction conditions.

In a tenth embodiment, the invention is directed to the process according to one of the first to the ninth embodiments in which the H-functional starter substance ($S_i$) comprises a polyoxyalkylene polyol which additionally comprises an antioxidant and/or an acid.

In an eleventh embodiment, the invention is directed to the process according to one of the first to the tenth embodiments wherein the H-functional starter substance ($S_x$) has an equivalent weight of about 20 Da to about 70 Da, preferably of 30 Da to 50 Da.

In a twelfth embodiment, the invention is directed to the process according to one of the first to the eleventh embodiments wherein said H-functional starter substance ($S_x$) comprises ethylene glycol, propylene glycol, butylene glycol, glycerin, water, trimethylolpropane, sorbitol, sucrose, or combinations thereof.

In a thirteenth embodiment, the invention is directed to the process according to one of the first to the twelfth embodiments in which the H-functional starter substance ($S_c$) has an equivalent weight of about 30 Da to about 50 Da.

In a fourteenth embodiment, the invention is directed to the process according to one of the first to the thirteenth embodiments in which (a) the alkylene oxide which is continuously added in (γ) comprises propylene oxide, ethylene oxide, or combinations thereof.

In a fifteenth embodiment, the invention is directed to the process according to one of the second to the fourteenth embodiments in which (b) the alkylene oxide which is added in (β) comprises propylene oxide, ethylene oxide, or combinations thereof.

In a sixteenth embodiment, the invention is directed to the process according to one of the first to the fifteenth embodiments in which the H-functional starter substance ($S_x$) is present in an amount of from 0.1 to 2.0 weight percent, preferably from 0.25 to 1.75 weight percent, more preferably from 0.5 to 1.5 weight percent, based on the weight of said H-functional starter substance ($S_i$) present in said starter mixture of step (α).

In a seventeenth embodiment, the invention is directed to the process according to one of the first to the sixteenth embodiments wherein the H-functional starter substance ($S_x$) and the H-functional starter substance ($S_c$) are the same substance.

In an eighteenth embodiment, the invention is directed to the process according to one of the first to the seventeenth embodiments wherein the H-functional starter substance ($S_c$) comprises ethylene glycol, propylene glycol, butylene glycol, glycerin, water, trimethylolpropane, sorbitol, sucrose, or combinations thereof.

In a nineteenth embodiment, the invention is directed to the process according to one of the first to the eighteenth embodiments wherein the H-functional starter substance ($S_c$) additionally comprises at least one acid.

In a twentieth embodiment, the invention is directed to the process according to one of the first to the nineteenth embodiments wherein the polyoxyalkylene polyols (P) formed have a functionality of from 2 to 6 and a hydroxyl number of about 8 to 30, preferably a functionality of from 2 to 3 and a hydroxyl number of from 14 to 28.

In a twenty-first embodiment, the invention is directed to the process according to one of the first to the twentieth embodiments, wherein the amount of alkylene oxide added in step (γ) to activate the catalyst is from 1 to 12 weight percent of the H-functional starter substance ($S_i$) present in the starter mixture of step (α).

In a twenty-second embodiment, the invention is directed to the process according to one of the second to the twentieth embodiments wherein the amount of alkylene oxide added to activate the catalyst in (β) is from 1 to 12 weight percent of the H-functional starter substance ($S_i$) present in the starter mixture of step (α).

In a twenty-third embodiment, the invention is directed to the process according to one of the first to the twenty-second embodiments wherein step (δ) continuously adding said H-functional starter substance ($S_c$) starts before 4 weight percent, preferably before 2 weight percent, of the total weight of alkylene oxide added from step (γ) is fed.

In a twenty-fourth embodiment, the invention is directed to the process according to one of the second to the twenty-third embodiments, wherein step (δ) continuously adding said H-functional starter substance ($S_c$) starts before 4 weight percent, preferably before 2 weight percent, of the total weight of alkylene oxide added from steps (β) and (γ) is fed.

In a twenty-fifth embodiment, the invention is directed to the process according to one of the first to the twenty-fourth embodiments wherein the resultant polyoxyalkylene polyol (P) additionally comprises an antioxidant and/or an acid.

In a twenty-sixth embodiment, the invention is directed to the process according to one of the first to the twenty-fifth embodiments, wherein in step (δ), the final feed rate ratio of the H-functional starter substance ($S_c$) to alkylene oxide is <1.0%.

In a twenty-seventh embodiment, the invention is directed to the process according to one of the first to the twenty-sixth embodiments, wherein in step (δ), the weight of the H-functional starter substance ($S_c$) fed at the final feed rate ratio is >1 weight percent of the total combined weight of the H-functional starter substance ($S_c$) and of the H-functional starter substance ($S_x$).

In a twenty-eighth embodiment, the invention is directed to the process according to one of the first to the twenty-seventh embodiments, wherein the weight of the H-functional starter substance ($S_c$) is >50 weight percent of the total combined weight of the H-functional starter substance ($S_c$) and of the H-functional starter substance ($S_x$).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

In the examples, the OH (hydroxyl numbers) were determined in accordance with ASTM D-4274-11, as described above, and are reported in mg [KOH]/g polyol.

Viscosity was determined in accordance with ASTM-D4878-15 as described above.

Gel Permeation Chromatography (GPC) was used to determine the molecular weights (weight average and number average) in accordance with DIN 55672-1 as described hereinabove. All molecular weights are number average unless specified otherwise.

The examples herein were carried out in a 35 Liter stainless steel reaction vessel equipped with an electrically heated jacket and an internal coil that can be used for cooling the reaction mixture using water. The reactor was equipped with baffles and an agitator that contains a Ruston type agitator at the bottom and pitched blade in the upper portion. The alkylene oxide and continuously added H-functional starter substance ($S_c$) feeds were introduced into the liquid phase using dip pipes.

The following compounds or materials were used in the examples.

Catalyst A: A double metal cyanide catalyst prepared according to the procedure in U.S. Pat. No. 5,482,908.

Irganox E-201: a primary (phenolic) antioxidant, which contains Vitamin E, and is commercially available from BASF

Comparative Example 1

To the 35 L reactor described above 2500 grams of an all-PO, 8000 MW diol ($S_i$) (~14 OH #) made via semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. Propylene oxide (100 g) was charged to activate the catalyst. The pressure increased to 10 psia and then steadily decreased indicating the catalyst was active. When the pressure reached 2 psia, the PO feed was restarted and ramped to 74.9 g/min over 20 minutes. Simultaneously, propylene glycol, as the continuously added starter ($S_c$), was started and ramped to a feed rate of 0.77 g/min. The PG, as $S_c$, started after 100 g of PO was fed or 0.6 wt % of the total PO to be fed (100 g/17334 g). The PG was fed at a feed rate ratio of 1.02 wt. % based on the PO feed rate (0.77 g/min PG/74.9 g/min PO). The PG and PO feeds continued until the PG feed met the target weight of 166.2 grams. At the targeted PG/PO feed rate ratio of 1.02 wt. % the target was reached after 16334 grams of PO was fed or 94% of the total PO. The PG/PO ratio based on weight was 1.02 wt % (166.2 g PG/16234 g PO). The remaining 1000 grams of PO continued at the feed rate of 74.9 g/min until the final PO target of 17334 grams was reached. The feeding of 1000 grams of PO without the PG feed corresponds to a "non-CAOS" cap of 5 wt. % based on the total batch weight (1000 g/20000 g batch). The final product (P) was inhibited with 160 ppm Irganox E-201. The final product (P) had a hydroxyl number of 14 mg KOH/g and a viscosity of 3726 cst (adjusted viscosity of 3726 cst, adjusting to a hydroxyl number of 14.0 mg KOH/g polyol, adjusting the viscosity to a given hydroxyl number is important for comparison of high equivalent weight products as the viscosity can vary significantly with equivalent weight) and a polydispersity index (Mw/Mn) of 1.137. This comparative example was made with no "pre-CAOS" charge (no $S_x$) to the starter mixture and with a 5 weight percent "non-CAOS" cap. FIG. 1 illustrates the molecular weight distribution made using this Product-to-Product process has a shoulder or non-uniformity at the higher molecular weight side resulting from the polyoxyalkylene polyol which was used as the H-functional starter substance ($S_i$) of the starter mixture reacting with the activation alkylene oxide as no PG or low equivalent weight H-functional starter substance ($S_x$) was present in the starter mixture.

Example 2

To the 35 L reactor described above, 2491 grams of an all-PO, 8000 MW diol ($S_i$) (~14 OH #) made via a semi-batch process using Catalyst A and 0.673 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol (S$_x$) (0.5 wt. % PG based on the polyoxyalkylene polyol substance (S$_i$) of the starter mixture weight) were charged to the polyoxyalkylene polyol starter substance (S$_i$) and catalyst mixture. The 12.5 grams of PG represents a 0.5 wt. % "pre-CAOS" charge (12.5 g PG/2491 g S$_i$). Propylene oxide (100 g) was charged to activate the catalyst. The pressure increased to 15 psia and then steadily decreased, indicating the catalyst was active. When the pressure reached 7 psia, the PO feed was restarted and ramped to 85.4 g/min over 20 minutes. Simultaneously, propylene glycol, as the continuously added starter (S$_c$), was started and ramped to a feed rate of 0.79 g/min. The PG, as S$_c$, started after 100 g of PO was fed or 0.5 wt % of the total PO to be fed (100 g/19739 g). The PG was fed at an initial feed rate ratio of 0.94 wt % based on the PO feed rate (0.79 g/min PG/85.4 g/min PO). The PG and PO feeds continued until the PO feed reached 18618 grams or 94% of the total PO to be fed and the PG totaled 173.4 g. At this point the PG feed rate was decreased to 0.26 g/min and the PO continued feeding at 85.4 g/min giving a final PG/PO feed rate ratio of 0.3 wt. %. The PO and PG continued at these rates until the PO reached a target of 19739 grams and the PG reached a target of 176.8 grams fed as S$_c$. The 176.8 grams of PG fed as S$_c$ is 93.4 wt % of the total S$_c$+S$_x$ ((S$_c$/(S$_c$+S$_x$)) or (176.8/189.3)). The feeding of 1121 grams of PO and 3.4 grams of PG at the end of batch corresponds to a "low-CAOS" cap of 5% based on the total batch weight (1121 g/22419 g batch). The final PG/PO feed rate ratio of 0.3 wt % was 32% of the initial PG/PO feed rate ratio of 0.94% (0.3/0.94*100=32%) and the 3.4 grams of PG fed at the final feed rate ratio was 1.8% of the total PG fed (3.4/(176.8+12.5)). The initial PG/PO ratio based on the weights of PG and PO fed is 0.94 wt % (173.4 g PG/18518 g PO). The final PG/PO ratio based on the weights of PG and PO fed is 0.3 wt % (3.4 g PG/1121 g PO). The final product (P) was inhibited with 160 ppm Irganox E-201. The final product (P) had a hydroxyl number of 13.7 mg KOH/g polyol, a viscosity of 3133 cSt (adjusted viscosity of 2935 cSt, adjusting to a hydroxyl number of 14.0 mg KOH/g polyol) and a polydispersity index (Mw/Mn) of 1.075. The product (P) of this example was made with a "pre-CAOS" or H-functional starter substance (S$_x$) charge to the polyoxyalkylene polyol H-functional starter substance (S$_i$) of the starter mixture and with a 5 weight percent "low-CAOS" cap. The viscosity (and adjusted viscosity) and polydispersity of the product (P) was improved with the "low-CAOS" cap over Example 1.

Example 3

To the 35 L reactor described above, 2500 grams of an all-PO, 8000 MW diol (S$_i$) (~14 OH #) made via a semi-batch process using Catalyst A and 0.675 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol (S$_x$) (0.5 wt. % PG based on the weight of the polyoxyalkylene polyol substance (S$_i$) of the starter mixture) were charged to the polyoxyalkylene polyol starter substance (S$_i$) and catalyst mixture. The 12.5 grams of PG represents a 0.5 wt. % "pre-CAOS" charge (12.5 g PG/2500 g S$_i$). Propylene oxide (100 g) was charged to activate the catalyst. The pressure increased to 15 psia and then steadily decreased, indicating the catalyst was active. When the pressure reached 7 psia, the PO feed was restarted and ramped to 85.7 g/min over 20 minutes. Simultaneously, propylene glycol, as the continuously added starter (S$_c$), was started and ramped to a feed rate of 0.92 g/min. The PG, as S$_c$, started after 100 g of PO was fed or 0.5 wt % of the total PO to be fed (100 g/19810 g). The PG was fed at an initial feed rate ratio of 1.08 wt. % based on the PO feed rate (0.92 g/min PG/85.7 g/min PO). The PG and PO feeds continued until the PO feed reached 15310 grams or 77% of the total PO to be fed and the PG totaled 163.9 g. At this point the PG feed rate was decreased to 0.26 g/min and the PO continued feeding at 85.7 g/min giving a final PG/PO feed rate ratio of 0.3 wt. %. The PO and PG continued at these rates until the PO reached a target of 19810 grams and the PG reached a target of 177.4 grams fed as S$_c$. The 177.4 grams of PG fed as S$_c$ is 93.4 wt % of the total S$_c$+S$_x$ ((S$_c$/(S$_c$+S$_x$)) or (177.4/189.9)). The feeding of 4500 grams of PO and 13.5 grams of PG at the end of batch corresponds to a 20% "low-CAOS" cap based on the total batch weight (4500 g/22500 g batch). The final PG/PO feed rate ratio of 0.3 wt % was 28% of the initial PG/PO feed rate ratio of 1.08% (0.3/1.08*100=28%) and the 13.5 grams of PG fed at the final feed rate ratio was 7.1% of the total PG fed (13.5/(177.4+12.5)). The initial PG/PO ratio based on the weights of PG and PO fed is 1.08 wt % (163.9 g PG/15210 g PO). The final PG/PO ratio based on the weights of PG and PO fed is 0.3 wt % (13.5 g PG/4500 g PO). The final product (P) was inhibited with 160 ppm Irganox E-201. The final product (P) had a hydroxyl number of 13.6 mg KOH/g polyol, a viscosity of 3136 cst (adjusted viscosity of 2872 cst, adjusting to a hydroxyl number of 14.0 mg KOH/g polyol) and a polydispersity index (Mw/Mn) of 1.058. The product (P) of this example was made with a "pre-CAOS" or H-functional starter substance (S$_x$) charge to the polyoxyalkylene polyol substance (S$_i$) of the starter mixture and with a 20 weight percent "low-CAOS" cap.

Example 4

To the 35 L reactor described above, 2495 grams of an all-PO, 8000 MW diol (S$_i$) (~14 OH #) made via a semi-batch process using Catalyst A and 0.674 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol (S$_x$) (0.5 wt. % PG based on the weight of the polyoxyalkylene polyol substance (S$_i$) of the starter mixture) were charged to the polyoxyalkylene polyol starter substance (S$_i$) and catalyst mixture. The 12.5 grams of PG represents a 0.5 wt. % "pre-CAOS" charge (12.5 g PG/2495 g S$_i$). Propylene oxide (100 g) was charged to activate the catalyst. The pressure increased to 13 psia and then steadily decreased, indicating the catalyst was active. When the pressure reached 3 psia, the PO feed was restarted and ramped to 85.5 g/min over 20 minutes. Simultaneously, propylene glycol, as the continuously added starter (S$_c$), was started and ramped to a feed rate of 1.44 g/min. The PG, as S$_c$, started after 100 g of PO was fed or 0.5 wt % of the total PO to be fed (100 g/19771 g). The PG was fed at an initial feed rate ratio of 1.70 wt. % based on the PO feed rate (1.44 g/min PG/85.5 g/min PO). The PG and PO feeds continued until the PO feed reached 8543 grams or 43% of the total PO to be fed and the PG totaled 143.4 g. At this point the PG feed rate was decreased to 0.26 g/min and the PO continued feeding at 85.5 g/min giving a PG/PO feed rate ratio of 0.3 wt. %. The PO and PG continued at these rates until the PO reached a target of 19771 grams and the PG reached a target of 177.1 grams fed as S$_c$. The 177.1 grams of PG fed as S$_c$ is 93.4 wt % of the total S$_c$+S$_x$ ((S$_c$/(S$_c$+S$_x$)) or (177.1/

Figure 2:
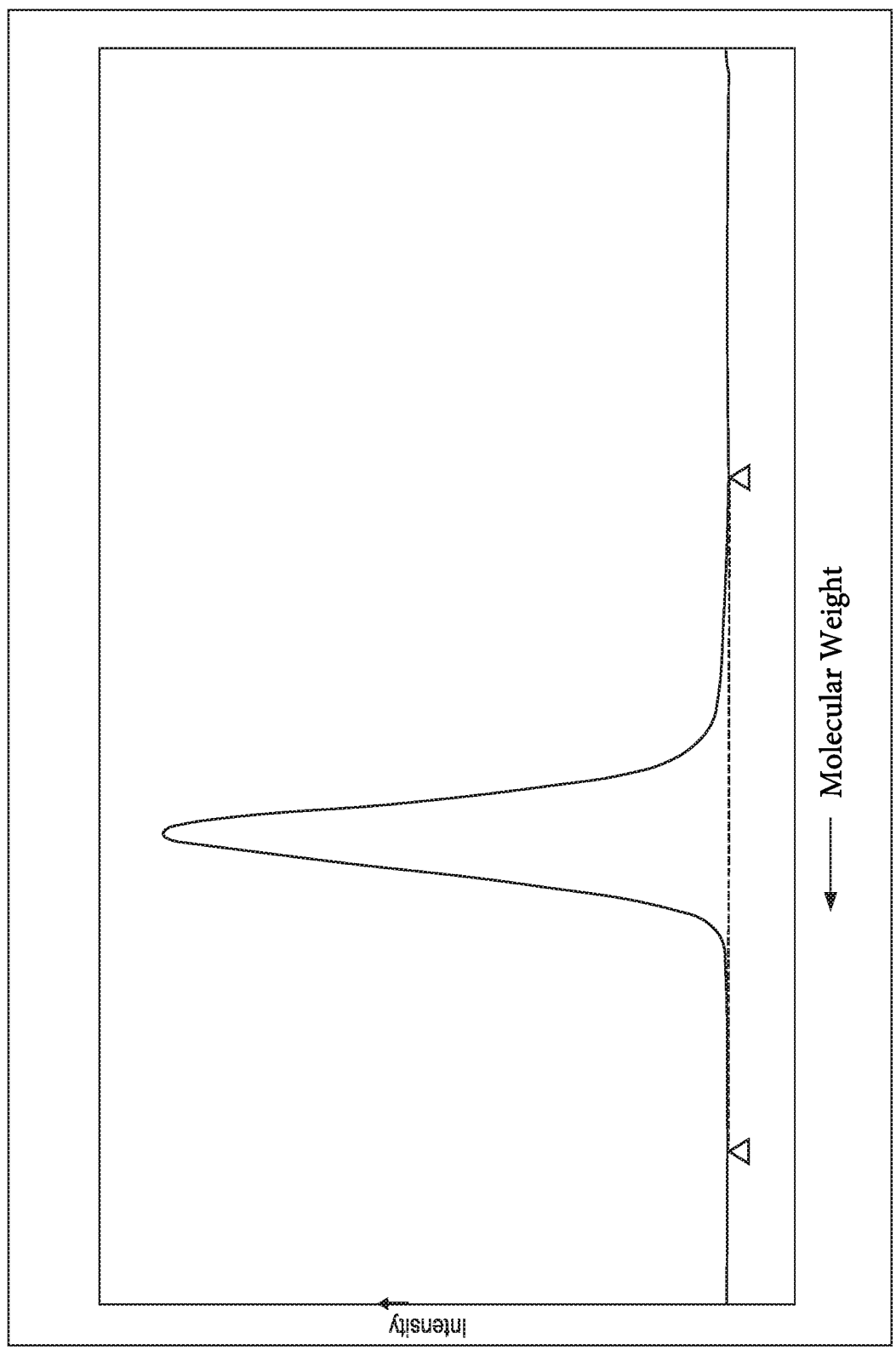
FIG. 2 is a GPC illustrating the molecular weight distribution of a product prepared in accordance with the present invention with a pre-CAOS charge and a 50% low-CAOS cap.

189.6)). The feeding of 11228 grams of PO and 33.7 grams of PG at the end of batch corresponds to a "low-CAOS" cap of 50% based on the total batch weight (11228 g/22455 g batch). The final PG/PO feed rate ratio of 0.3 wt % was 18% of the initial PG/PO feed rate ratio of 1.70 wt % (0.3/1.70*100=18%) and the 33.7 grams of PG fed at the final feed rate ratio was 17.8% of total PG fed (33.7/(177.1+12.5)). The initial PG/PO ratio based on the weights of PG and PO fed is 1.70 wt % (143.4 g PG/8443 g PO). The final PG/PO ratio based on the weights of PG and PO fed is 0.3 wt % (33.7 g PG/11228 g PO). The final product (P) was inhibited with 160 ppm Irganox E-201. The final product (P) had a hydroxyl number of 14 mg KOH/g polyol, a viscosity of 2842 cSt (adjusted viscosity of 2842 cSt, adjusting to a hydroxyl number of 14.0 mg KOH/g polyol) and a polydispersity index (Mw/Mn) of 1.054. The product (P) of this example was made with a "pre-CAOS" or H-functional starter substance ($S_x$) charge to the polyoxyalkylene polyol substance ($S_i$) of the starter mixture and with a 50 weight percent "low-CAOS" cap. FIG. 2 illustrates that the high molecular weight shoulder was eliminated by adding the PG ($S_x$) or "pre-CAOS" charge to the polyoxyalkylene polyol substance ($S_i$) of the starter mixture prior to activation of the DMC catalyst with PO. The viscosity (and adjusted viscosity) of Example 4 was lower than the viscosity of Comparative Example 1 due to the narrow molecular weight distribution of the product in Example 4.

Example 5

To the 35 L reactor described above, 2472 grams of an all-PO, 11500 MW diol ($S_i$) (~9.8 OH #) made via a semi-batch process using Catalyst A and 0.678 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.4 grams of propylene glycol ($S_x$) (0.5 wt. % PG based on the weight of the polyoxyalkylene polyol substance ($S_i$) of the starter mixture) were charged to the polyoxyalkylene polyol starter substance ($S_i$) and catalyst mixture. The 12.4 grams of PG represents a 0.5 wt. % "pre-CAOS" charge (12.4 g PG/2472 g $S_i$). Propylene oxide (99 g) was charged to activate the catalyst. The pressure increased to 13 psia and then steadily decreased, indicating the catalyst was active. When the pressure reached 3 psia, the PO feed was restarted and ramped to 55.9 g/min over 20 minutes. Simultaneously, propylene glycol, as the continuously added starter ($S_c$), was started and ramped to a feed rate of 0.38 g/min. The PG, as $S_c$, started after 99 g of PO was fed or 0.5 wt % of the total PO to be fed (99 g/19648 g). The PG was fed at an initial feed rate ratio of 0.71 wt. % based on the PO feed rate (0.38 g/min PG/55.9 g/min PO). The PG and PO feeds continued until the PO feed reached 15198 grams or 77% of the total PO to be fed and the PG totaled 107.1 g. At this point the PG feed rate was decreased to 0.15 g/min and the PO continued feeding at 55.9 g/min giving a final PG/PO feed rate ratio of 0.27 wt. %. The PO and PG continued at these rates until the PO reached a target of 19648 grams and the PG reached a target of 118.7 grams fed as $S_c$. The 118.7 grams of PG fed as $S_c$ is 90.5 wt % of the total $S_c+S_x$ (($S_c/(S_c+S_x)$) or (118.7/131.1)). The feeding of 4450 grams of PO and 11.6 grams of PG at the end of batch corresponds to a "low-CAOS" cap of 20% based on the total batch weight (4450 g/22251 g batch). The final PG/PO feed rate ratio of 0.27 wt % was 38% of the initial PG/PO feed rate ratio of 0.71 wt % (0.27/0.71*100=38%) and the 11.6 grams of PG fed at the final feed rate ratio was 8.8% of the total PG fed (11.6/(118.7+12.4)). The initial PG/PO ratio based on the weights of PG and PO fed is 0.71 wt % (107.1 g PG/15099 g PO). The final PG/PO ratio based on the weights of PG and PO fed is 0.26 wt % (11.6 g PG/4450 g PO). The final product (P) was inhibited with 160 ppm Irganox E-201. The final product (P) had a hydroxyl number of 9.77 mg KOH/g polyol, a viscosity of 6948 cSt (adjusted viscosity of 6915 cSt, adjusting to a hydroxyl number of 9.8 mg KOH/g polyol) and a polydispersity index (Mw/Mn) of 1.066. The product (P) of this example was made with a "pre-CAOS" or H-functional starter substance ($S_x$) charge to the polyoxyalkylene polyol H-functional starter substance ($S_i$) of the starter mixture and with a 20 weight percent "low-CAOS" cap.

Example 6

To the 35 L reactor described above, 2494 grams of an all-PO, 11500 MW diol ($S_i$) (~9.8 OH #) made via a semi-batch process using Catalyst A and 0.68 grams of Catalyst A were charged. This mixture was heated to 130° C. Vacuum was applied to a level of 0.1 psia and nitrogen was introduced via a dip tube or to the liquid phase for 30 minutes. After the nitrogen was stopped, 12.5 grams of propylene glycol ($S_x$) (0.5 wt. % PG based on the weight of the polyoxyalkylene polyol substance ($S_i$) of the starter mixture) were charged to the polyoxyalkylene polyol starter substance ($S_i$) and catalyst mixture. The 12.5 grams of PG represents a 0.5 wt. % "pre-CAOS" charge (12.5 g PG/2494 g $S_i$). Propylene oxide (100 g) was charged to activate the catalyst. The pressure increased to 15 psia and then steadily decreased, indicating the catalyst was active. When the pressure reached 5 psia, the PO feed was restarted and ramped to 56.4 g/min over 20 minutes. Simultaneously, propylene glycol, as the continuously added starter ($S_c$), was started and ramped to a feed rate of 0.57 g/min. The PG, as $S_c$, started after 100 g of PO was fed or 0.5 wt % of the total PO to be fed (100 g/19819 g). The PG was fed at an initial feed rate ratio of 1.06 wt. % based on the PO feed rate (0.57 g/min PG/56.4 g/min PO). The PG and PO feeds continued until the PO feed reached 8600 grams or 43% of the total PO to be fed and the PG totaled 89.8 g. At this point, the PG feed rate was decreased to 0.15 g/min and the PO continued feeding at 56.4 g/min giving a final PG/PO feed rate ratio of 0.27 wt. %. The PO and PG continued at these rates until the PO reached a target of 19819 grams and the PG reached a target of 120.1 grams fed as $S_c$. The 120.1 grams of PG fed as $S_c$ is 90.6 wt % of the total $S_c+S_x$ (($S_c/(S_c+S_x)$) or (120.1/132.6)). The feeding of 11219 grams of PO and 30.3 grams of PG at the end of batch corresponds to a "low-CAOS" cap of 50% based on the total batch weight (11219 g/22446 g batch). The final PG/PO feed rate ratio of 0.27 wt % was 26% of the initial PG/PO feed rate ratio of 1.06 wt % (0.27/1.06*100=26%) and the 30.3 grams of PG fed at the final feed rate ratio was 22.8% of the total PG fed (30.3/(120.1+12.5)). The initial PG/PO ratio based on the weights of PG and PO fed is 1.06 wt % (89.8 g PG/8500 g PO). The final PG/PO ratio based on the weights of PG and PO fed is 0.27 wt % (30.3 g PG/11219 g PO). The final product (P) was inhibited with 160 ppm Irganox E-201. The final product (P) had a hydroxyl number of 9.99 mg KOH/g, a viscosity of 6852 cSt (adjusted viscosity of 7061 cSt, adjusting to a hydroxyl number of 9.8 mg KOH/g polyol) and a polydispersity index (Mw/Mn) of 1.057. The product (P) of this example was made with a "pre-CAOS" or H-functional starter substance ($S_x$) charge to the polyoxyalkylene polyol H-functional starter substance ($S_i$) of the starter mixture and with a 50% "low-CAOS" cap.

TABLE 1

|  | Comp. Ex. 1 | Ex. 2 | Ex. 3 | Ex. 4 | Ex. 5 | Ex. 6 |
|---|---|---|---|---|---|---|
| Initial Starter, $S_i$ wt, g | 2500 | 2491 | 2500 | 2495 | 2472 | 2494 |
| Initial Starter, $S_i$ OH#, mg KOH/g polyol | 14 | 14 | 14 | 14 | 9.8 | 9.8 |
| Build Ratio | 8 | 9 | 9 | 9 | 9 | 9 |
| Product wt, g | 20000 | 22419 | 22500 | 22455 | 22251 | 22446 |
| Target Product OH#, mg KOH/g polyol | 14 | 14 | 14 | 14 | 9.8 | 9.8 |
| Propylene glycol OH#, mg KOH/g polyol | 1474.4 | 1474.4 | 1474.4 | 1474.4 | 1474.4 | 1474.4 |
| PG total ($S_c + S_x$), g | 166.2 | 189.3 | 189.9 | 189.6 | 131.1 | 132.6 |
| PO total, g | 17334 | 19739 | 19810 | 19771 | 19648 | 19819 |
| Activation PO, wt % of $S_i$ | 4% | 4% | 4% | 4% | 4% | 4% |
| Activation PO, g | 100 | 100 | 100 | 100 | 99 | 100 |

TABLE 2

|  | Comp. Ex. 1 | Ex. 2 | Ex. 3 | Ex. 4 | Ex. 5 | Ex. 6 |
|---|---|---|---|---|---|---|
| $S_x$ or Pre-CAOS charge, wt % of $S_i$ | 0.0% | 0.5% | 0.5% | 0.5% | 0.5% | 0.5% |
| $S_x$ or Pre-CAOS charge, g | 0 | 12.5 | 12.5 | 12.5 | 12.4 | 12.5 |
| Total $S_c$, g | 166.2 | 176.8 | 177.4 | 177.1 | 118.7 | 120.1 |
| Low-CAOS Cap, wt % | 0% | 5% | 20% | 50% | 20% | 50% |
| Low-CAOS Cap, g | 0 | 1121 | 4500 | 11228 | 4450 | 11219 |
| Non-CAOS Cap, wt. % | 5% | 0% | 0% | 0% | 0% | 0% |
| Non-CAOS Cap, g | 1000 | 0 | 0 | 0 | 0 | 0 |
| $S_c$ fed at initial feed rate ratio, g | 166.2 | 173.4 | 163.9 | 143.4 | 107.1 | 89.8 |
| Initial $S_c$/alkylene oxide feed rate ratio, (feed rate $S_c$/feed rate alkylene oxide), % | 1.02% | 0.94% | 1.08% | 1.70% | 0.71% | 1.06% |
| Final $S_c$/alkylene oxide feed rate ratio, (feed rate $S_c$/feed rate alkylene oxide), % | 0.0% | 0.3% | 0.3% | 0.3% | 0.27% | 0.27% |
| $S_c$ fed at final feed rate ratio or in Low-CAOS cap, g | 0.0 | 3.4 | 13.5 | 33.7 | 11.6 | 30.3 |
| Final $S_c$/alkylene oxide feed rate ratio/Initial $S_c$/alkylene oxide feed rate ratio, % | 0% | 32% | 28% | 18% | 38% | 26% |
| Weight % alkylene oxide when feed rate ratio changes, % | 94% | 94% | 77% | 43% | 77% | 43% |
| Wt % $S_c$ fed at final $S_c$/alkylene oxide feed rate ratio of total $S_c + S_x$, % | 0.0% | 1.8% | 7.1% | 17.8% | 8.8% | 22.8% |
| Wt % $S_c$ of total $S_c + S_x$, % | 100.0% | 93.4% | 93.4% | 93.4% | 90.5% | 90.6% |

TABLE 3

|  | Comp. Ex. 1 | Ex. 2 | Ex. 3 | Ex. 4 | Ex. 5 | Ex. 6 |
|---|---|---|---|---|---|---|
| Measured OH#[1] of Product, mg KOH/g polyol | 14 | 13.7 | 13.6 | 14 | 9.77 | 9.99 |
| Viscosity[2] of Product, cst @ 25° C. | 3726 | 3133 | 3136 | 2842 | 6948 | 6852 |
| Hydroxyl Number Adjusted Viscosity of Product[3], cst @ 25° C. | 3726 | 2935 | 2872 | 2842 | 6915 | 7061 |
| Polydispersity Index[4] of Product (Mw/Mn) | 1.137 | 1.075 | 1.058 | 1.054 | 1.066 | 1.057 |

[1]measured in accordance with ASTM-D4274-11
[2]measured in accordance with ASTM D-4878-15
[3]adjusted to target value (14.0 mg KOH/g for Examples 1, 2, 3 and 4; 9.8 mgKOH/g for Examples 5 and 6) by using measured OH# and measured viscosity and linearly increasing viscosity when the measured OH# is greater than target (MW or EQ is less than target so MW or EQ must increase to reach target therefore viscosity increases) and linearly decreasing viscosity when the measured OH# is less than target (MW or EQ is greater than target so MW or EQ must decrease to reach target therefore viscosity decreases)
[4]measured in accordance with DIN 5567201

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyoxyalkylene polyol (P) having a functionality of 2 to 8 and a hydroxyl number of from 5 mg KOH/g to 35 mg KOH/g by reaction of H-functional starter substances ($S_i$), ($S_c$) and ($S_x$) with one or more alkylene oxides in the presence of a double metal cyanide catalyst (DMC), comprising (α) forming a starter mixture comprising said H-functional starter substances ($S_i$) and ($S_x$), and said double metal cyanide catalyst, and optionally, stripping the starter mixture under vacuum with nitrogen;

(γ) continuously adding (a) an alkylene oxide to the starter mixture of step (α); and (δ) continuously adding said H-functional starter substance ($S_c$);

wherein steps (γ) and (δ) either start simultaneously or step (γ) starts before step (δ);

(ii) the theoretical functionality of said H-functional starter substance ($S_i$) is identical to the theoretical functionality of said polyoxyalkylene polyol (P) and the measured hydroxyl number of said H-functional starter substance ($S_i$) is within 10% of the measured hydroxyl number of said polyoxyalkylene polyol (P);

(iii) said H-functional starter substance ($S_x$) has an equivalent weight greater than or equal to 10 Da and less than or equal to 250 Da;

(iv) said H-functional starter substance ($S_c$) has an equivalent weight of greater than or equal to 10 Da and less than or equal to 70 Da;

(v) in step (δ), the continuous addition of the H-functional starter substance ($S_c$) proceeds until completion of the polyoxyalkylation with alkylene oxide, in which the initial feed rate ratio of the H-functional starter substance ($S_c$) continues until from 30 to 95 weight percent of the total weight of alkylene oxide in step ($\gamma$) has been added, then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 50 to 5 percent of the initial feed rate ratio of the H-functional starter substance ($S_c$) to alkylene oxide;

and (vi) said hydroxyl numbers are determined according to ASTM D4274-11.

2. The process according to claim 1, additionally comprising:

($\beta$) adding an activation amount of (b) an alkylene oxide to the starter mixture of step ($\alpha$);

wherein in step ($\gamma$) the alkylene oxide (a) is continuously added to the mixture formed in ($\beta$); and (v) in step ($\delta$) the continuous addition of said H-functional starter substance ($S_c$) proceeds until completion of the polyoxyalkylation with alkylene oxide, in which the initial feed rate ratio of said H-functional starter substance ($S_c$) to alkylene oxide continues until 30 to 95 weight percent of the total weight of alkylene oxide in steps ($\beta$) and ($\gamma$) has been added, and then reducing to a final feed rate ratio of said H-functional starter substance ($S_c$) to alkylene oxide which ranges from 50 to 5 percent of the initial feed rate ratio of the H-functional starter substance ($S_c$) to alkylene oxide.

3. The process according to claim 1, wherein (ii) the measured hydroxyl number of said H-functional starter substance ($S_i$) is within 5% of the measured hydroxyl number of the polyoxyalkylene polyol (P).

4. The process according to claim 1, wherein (v) in step ($\delta$), the continuous addition of the H-functional starter substance ($S_c$) proceeds until completion of the polyoxyalkylation with alkylene oxide, in which the initial feed rate ratio of the H-functional starter substance ($S_c$) continues until from 30 to 95 weight percent of the total weight of alkylene oxide in step ($\gamma$) has been added, then the feed rate ratio of H-functional starter substance ($S_c$) to alkylene oxide is reduced to the final feed rate ratio of the H-functional starter substance ($S_c$) to alkylene oxide, with the final feed rate ratio of the H-functional starter substance ($S_c$) to alkylene oxide ranging from 45 to 10 percent of the initial feed rate ratio of the H-functional starter substance ($S_c$) to alkylene oxide.

5. The process according to claim 2, wherein (v) in step ($\delta$), the continuous addition of said H-functional starter substance ($S_c$) proceeds until completion of the polyoxyalkylation with alkylene oxide, in which the initial feed rate ratio of said H-functional starter substance ($S_c$) to alkylene oxide continues until 30 to 95 weight percent of the total weight of alkylene oxide in steps ($\delta$) and ($\gamma$) has been added, and then reducing to a final feed rate ratio of said H-functional starter substance ($S_c$) to alkylene oxide which ranges from 45 to 10 percent of the initial feed rate ratio of the H-functional starter substance ($S_c$) to alkylene oxide.

6. The process according to claim 1, wherein said H-functional starter substance ($S_i$) has a functionality of about 2 to about 8, and a hydroxyl number of 5 to 35.

7. The process according to claim 1, wherein said H-functional starter substance ($S_i$) comprises a polyoxyalkylene polyol containing double metal cyanide catalyst residuals.

8. The process according to claim 7, wherein said double metal cyanide catalyst residuals were previously exposed to alkylene oxide.

9. The process according to claim 7, wherein said double metal cyanide catalyst residuals comprise a pre-activated double metal cyanide catalyst which was previously exposed to alkylene oxide under reaction conditions.

10. The process according to claim 1, wherein said H-functional starter substance ($S_i$) comprises a polyoxyalkylene polyol which comprises an antioxidant and/or an acid.

11. The process according to claim 1, wherein said H-functional starter substance ($S_x$) has an equivalent weight of about 20 Da to about 70 Da.

12. The process according to claim 1, wherein said H-functional starter substance ($S_x$) comprises ethylene glycol, propylene glycol, butylene glycol, glycerin, water, trimethylolpropane, sorbitol, sucrose, or combinations thereof.

13. The process according to claim 1, wherein said H-functional starter substance ($S_c$) has an equivalent weight of about 30 Da to about 50 Da.

14. The process according to claim 1, wherein (a) said alkylene oxide which is continuously added in ($\gamma$) comprises propylene oxide, ethylene oxide, or combinations thereof.

15. The process according to claim 2, wherein (b) said alkylene oxide which is added in ($\delta$) comprises propylene oxide, ethylene oxide, or combinations thereof.

16. The process according to claim 1, wherein said H-functional starter substance ($S_x$) is present in an amount of from 0.1 to 2.0 weight percent, based on the weight of said H-functional starter substance ($S_i$) present in said starter mixture of step ($\alpha$).

17. The process according to claim 1, wherein said H-functional starter substance ($S_x$) and said H-functional starter substance ($S_c$) are the same substance.

18. The process according to claim 1, wherein said H-functional starter substance ($S_c$) comprises ethylene glycol, propylene glycol, butylene glycol, glycerin, water, trimethylolpropane, sorbitol, sucrose or combinations thereof.

19. The process according to claim 1, wherein said H-functional starter substance ($S_c$) additionally comprises at least one acid.

20. The process according to claim 1, wherein the polyoxyalkylene polyols (P) formed have a functionality of from 2 to 6 and a hydroxyl number of about 8 to 30.

21. The process according to claim 1, wherein the amount of (a) alkylene oxide added in step ($\gamma$) to activate the catalyst is from 1 to 12 weight percent of the H-functional starter substance ($S_i$) present in the starter mixture of step ($\alpha$).

22. The process according to claim 2, wherein the amount of (b) alkylene oxide added in step ($\delta$) to activate the catalyst is from 1 to 12 weight percent of the H-functional starter substance ($S_i$) present in the starter mixture of step ($\alpha$).

23. The process according to claim 1, wherein ($\delta$) continuously adding said H-functional starter substance ($S_c$) starts before 4 weight percent of the total weight of alkylene oxide added from step ($\gamma$) is fed.

24. The process according to claim 2, wherein ($\delta$) continuously adding said H-functional starter substance ($S_c$) starts before 4 weight percent of the total weight of alkylene oxide added from steps ($\delta$) and ($\gamma$) is fed.

25. The process according to claim 1, wherein the resultant polyoxyalkylene polyol (P) additionally comprises an antioxidant and/or an acid.

26. The process of claim 1, wherein in step ($\delta$), the final feed rate ratio of the H-functional starter substance ($S_c$) to alkylene oxide is <1.0%.

27. The process of claim 1, wherein in step (δ), the weight of the H-functional starter substance ($S_c$) fed at the final feed rate ratio is >1 weight percent of the total combined weight of the H-functional starter substance ($S_c$) and of the H-functional starter substance ($S_x$).

28. The process of claim 1, wherein the weight of the H-functional starter substance ($S_c$) is >50 weight percent of the total combined weight of the H-functional starter substance ($S_c$) and of the H-functional starter substance ($S_x$).

* * * * *